US010313681B2

(12) United States Patent
Koo et al.

(10) Patent No.: US 10,313,681 B2
(45) Date of Patent: Jun. 4, 2019

(54) TECHNIQUES FOR RATE-DISTORTION OPTIMIZATION IN VIDEO COMPRESSION

(71) Applicant: INTEL CORPORATION, Santa Clara, CA (US)

(72) Inventors: Heon-Mo Koo, Cupertino, CA (US); Atthar H. Mohammed, Folsom, CA (US); Thuan H. Pham, Rancho Cordova, CA (US)

(73) Assignee: INTEL CORPORATION, Santa Clara, CA (US)

( * ) Notice: Subject to any disclaimer, the term of this patent is extended or adjusted under 35 U.S.C. 154(b) by 366 days.

(21) Appl. No.: 14/133,078

(22) Filed: Dec. 18, 2013

(65) Prior Publication Data

US 2015/0172650 A1     Jun. 18, 2015

(51) Int. Cl.
| | |
|---|---|
| *H04N 19/147* | (2014.01) |
| *H04N 19/176* | (2014.01) |
| *H04N 19/13* | (2014.01) |
| *H04N 19/124* | (2014.01) |
| *H04N 19/42* | (2014.01) |

(52) U.S. Cl.
CPC ......... *H04N 19/176* (2014.11); *H04N 19/124* (2014.11); *H04N 19/13* (2014.11); *H04N 19/147* (2014.11); *H04N 19/42* (2014.11)

(58) Field of Classification Search
CPC ..... H04N 19/176; H04N 19/147; H04N 19/42
See application file for complete search history.

(56) References Cited

U.S. PATENT DOCUMENTS

| | | | | |
|---|---|---|---|---|
| 2003/0081850 | A1* | 5/2003 | Karczewicz | ......... H04N 19/176 382/247 |
| 2006/0088098 | A1* | 4/2006 | Vehvilainen | ..... H04N 21/23406 375/240.03 |
| 2008/0279466 | A1* | 11/2008 | Yang | .................... H04N 19/176 382/246 |
| 2009/0175332 | A1* | 7/2009 | Karczewicz | ......... H04N 19/176 375/240.03 |

* cited by examiner

*Primary Examiner* — Zhubing Ren

(57) ABSTRACT

Various embodiments are generally directed to techniques for reducing processing and/or storage resource requirements for RDO in compressing motion video. A device to compress motion video includes a first cost calculator to derive a first bitcost value of using a quantized coefficient of a quantized coefficient block of a frame of a video in compressing the video, the first bitcost value based on a context model of a context-adaptive binary arithmetic coder (CABAC); and a second cost calculator to derive a second bitcost value of replacing the quantized coefficient with an alternate value derived from the quantized coefficient in compressing the video, the second bitcost value based on the context model. Other embodiments are described and claimed.

22 Claims, 16 Drawing Sheets

TECHNIQUES FOR RATE-DISTORTION OPTIMIZATION IN VIDEO COMPRESSION

TECHNICAL FIELD

Embodiments described herein generally relate to reducing processing and/or storage requirements in compressing motion video in a manner that performs rate-distortion optimization (RDO).

BACKGROUND

Various forms of video compression have been devised to compress motion video for storage and/or transmission, including various versions of the Motion Picture Experts Group (MPEG) specification promulgated by the International Organization for Standardization of Geneva, Switzerland, and the H.26x series of specifications promulgated by the International Telegraph Union (ITU) also of Geneva, Switzerland. Such forms of video compression employ a combination of lossy and lossless compression techniques that take advantage of various characteristics commonly observed in many pieces of motion video and of various limitations of the human visual system (HVS).

Among the more commonly used lossy compression techniques is quantization of blocks of coefficients of each frame of a motion video in the frequency domain to remove higher frequency components that are less perceptible to the HVS, and are therefore less likely to be missed during video playback. Such quantization has long been carried out using parameters selected to minimize distortion that is perceptible to the HVS. However, in so doing, there has long been a tendency to ignore the resulting bitcost in the resulting compressed video bitstream. As a result, target bit data rates in transmission and/or bit data sizes in storage have been repeatedly exceeded.

More recently, various rate-distortion optimization (RDO) techniques have been devised to take into account bitcosts, as well as distortion, in the performance of quantization. Unfortunately, such techniques employ more complex calculations that require considerably greater processing and/or storage resources. Such increased requirements also result in correspondingly greater electric power requirements. This can become a significant issue when such forms of video compression are performed by a portable computing device relying upon a battery for the electric power to perform such calculations. Further, such calculations have been based on the use of feedback concerning actual bitcosts of video bitstreams resulting from the video compression. Such use of feedback introduces delays in the video compression that often require still more processing and/or storage resources to overcome.

DETAILED DESCRIPTION

Figure 1:
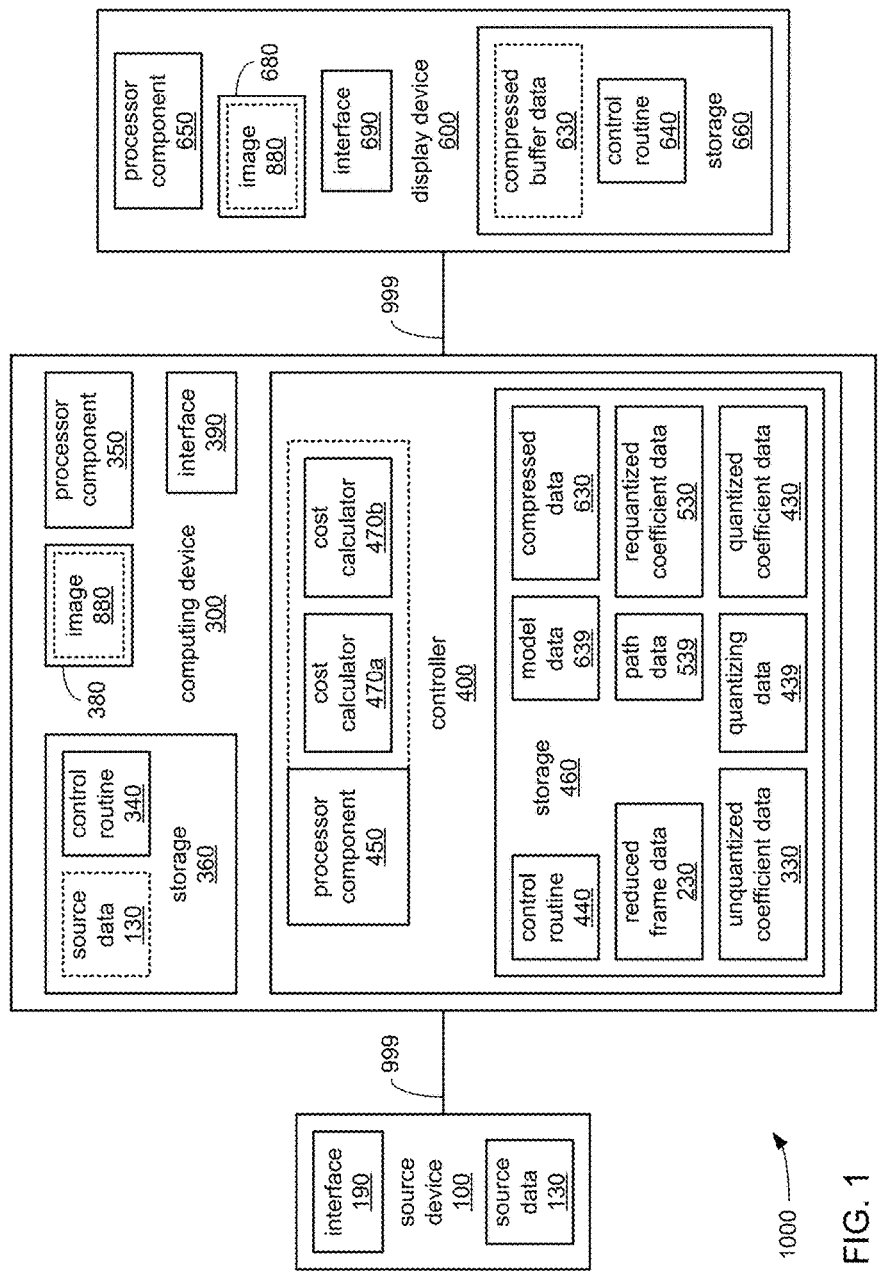
FIG. 1 illustrates an embodiment of a video processing system.

Various embodiments are generally directed to techniques for reducing processing and/or storage resource requirements for RDO in compressing motion video. A primary quantization of a block of coefficient values representing a block of a frame in the frequency domain is followed by a requantization of those coefficient values with a trellis quantizer. The trellis quantizer compares overall cost values of each possible combination of coefficient values derived by the primary quantization and of alternate values derived from the coefficient values to choose a combination of coefficient values and alternate values that achieves a lower overall cost measure. The overall cost measure is defined by a cost function that accounts for both bitcost in the resulting video bitstream and distortion arising in the video bitstream from both the primary and trellis quantizations.

To reduce processing and/or storage resources in determining bitcosts for each coefficient value and its corresponding alternative value, estimates of bitcosts may be employed based on the same initial context model selected for a context-adaptive binary arithmetic coder (CABAC) employed to perform entropy encoding. Selection of an initial context model occurs at least at the start of each frame, and may also occur at the start of each slice of the motion video being compressed. No feedback from the CABAC is employed in determining bitcosts, thereby removing the need for greater processing and/or storage resources to overcome the resulting delay incurred in awaiting such feedback, and reducing the complexity of the bitcost calculations.

To reduce processing and/or storage resources in determining distortion values for each coefficient value and its corresponding alternative value, values in the frequency domain may be employed in distortion calculations. This removes the need for additional processing and/or storage resources to perform a reverse transform to convert values out of the frequency domain for use in performing distortion calculations.

To increase the efficiency with which the overall cost measures are determined, the determinations of the bitcost and distortion values for each coefficient value and its corresponding alternate value may be performed in separate concurrently operated pipelines implemented in hardware and/or software. Independent hardware logic and/or logic within a processor component may be implemented to perform such concurrent determinations of bitcost and distortion values in a manner that removes a requirement to increase the processing clock rate of the processor component.

To further increase the efficiency with which the overall cost measures are determined, the calculation of bitcost and distortion values for coefficient values of zero are entirely skipped. Still further, the rounding value employed in the primary quantization may be made programmable in response to actual bitcosts of the video bitstream resulting from video compression such that the rounding value may be changed at least at the start of each frame to achieve a bitcost value within a specified range.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a video processing system 1000 incorporating one or more of a source device 100, a computing device 300 and a display device 600. In the video presentation system 1000, source data 100 representing motion video imagery 880 is compressed by the computing device 300 to generate compressed data 630 that also represents the motion video imagery 880, but in compressed form. The source data 100 may be received by the computing device 300 from the source device 100. The compressed data 630 may be stored within the computing device 300, decompressed and visually displayed by the computing device 300, and/or transmitted to the display device 600 to be decompressed and visually presented by the display device 600. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 600 exchange signals conveying compressed and/or uncompressed data representing the motion video 880 and/or related data through a network 999. However, one or more of these computing devices may exchange other data entirely unrelated to the motion video 880 with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the source device 100 (if present) incorporates an interface 190 to couple the source device 100 to the computing device 300 to provide the computing device 300 with the source data 130. As depicted, the interface 190 may couple the source device 100 to the computing device 300 through the same network 999 as couples the computing device 300 to the display device 600. However, in other embodiments, the source device 100 may be coupled to the computing device 300 in an entirely different manner. At least a portion of the source data 130 may have been created via the source device 100, e.g., where the source device 100 either is or incorporates a camera such that the source data 100 includes representations of the frames of the motion video 880 captured by the source device 100. Alternatively or additionally, at least a portion of the source data 130 may simply be stored on the source device 100 for later conveyance to the computing device 300 following its receipt from yet another device.

In various embodiments, the computing device 300 incorporates one or more of a processor component 350, a storage 360, a controller 400, a display 380 and an interface 390 to couple the computing device 300 to the network 999. The storage 360 stores one or more of a control routine 340 and the source data 130. The controller 400 incorporates one or more of a processor component 450, a storage 460 and cost calculators 470a and 470b. As depicted, the cost calculators 470a and 470b may be implemented as hardware logic that may be incorporated into the processor component 450. The storage 460 stores one or more of a control routine 440, reduced frame data 230, unquantized coefficient data 330, quantized coefficient data 430, quantizing data 439, requantized data 530, path data 539, compressed data 630 and model data 639.

The control routine 340 incorporates a sequence of instructions operative on the processor component 350 in its role as a main processor component of the computing device 300 to implement logic to perform various functions. In executing the control routine 340 in some embodiments, the processor component 350 may receive the source data 130 representing the motion video 880 from the source device 100, and may store at least a subset thereof in the storage 360. It should be noted that the source data 130 may be stored in the storage 360 for a considerable amount of time before any use is made of it, including compression, decompression and/or transmission thereof. Where the source data 130 is in compressed form, the processor component 350, in executing the control routine 340, may decompress it. Where the source data 130 requires color space conversion in preparation for being compressed, the processor component 350, in executing the control routine 340, may convert its color space. The processor component 350 then provides the source data 130 to the controller 400 to be compressed.

Figure 3:
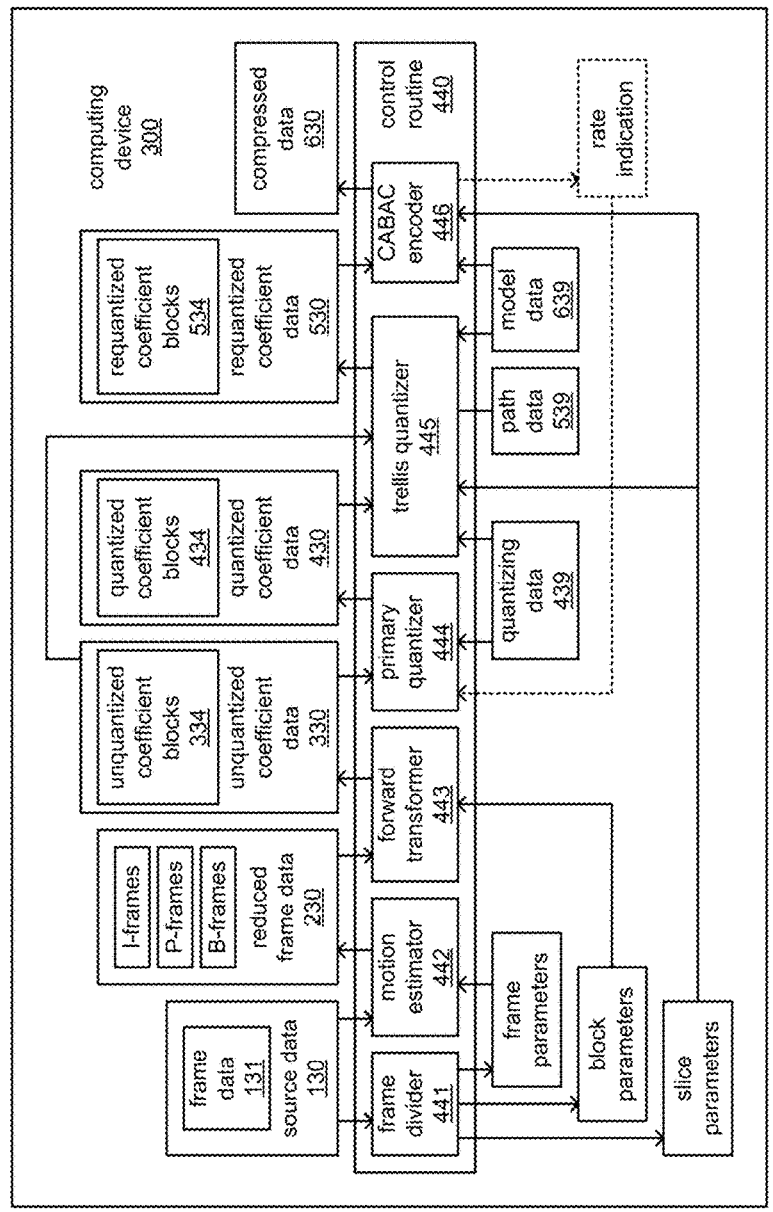
FIG. 3 illustrates a portion of an embodiment.

The control routine 440 incorporates a sequence of instructions operative on the processor component 450 in its role as a controller processor component of the controller 400 of the computing device 300 to implement logic to perform various functions. In executing the control routine 440, the processor component 450 compresses the source data 130 representing the motion video 880 to generate the compressed data 630 that also represents the motion video 880, but in compressed form. FIG. 3 depicts an example embodiment of the compression of the source data 130 to generate the compressed data 630 by execution of at least a portion of the control routine 440 in greater detail. As depicted, the control routine 440 may incorporate one or more of a frame divider 441, a motion estimator 442, a forward transformer 443, a primary quantizer 444, a trellis quantizer 445 and a CABAC encoder 446.

Figure 4:
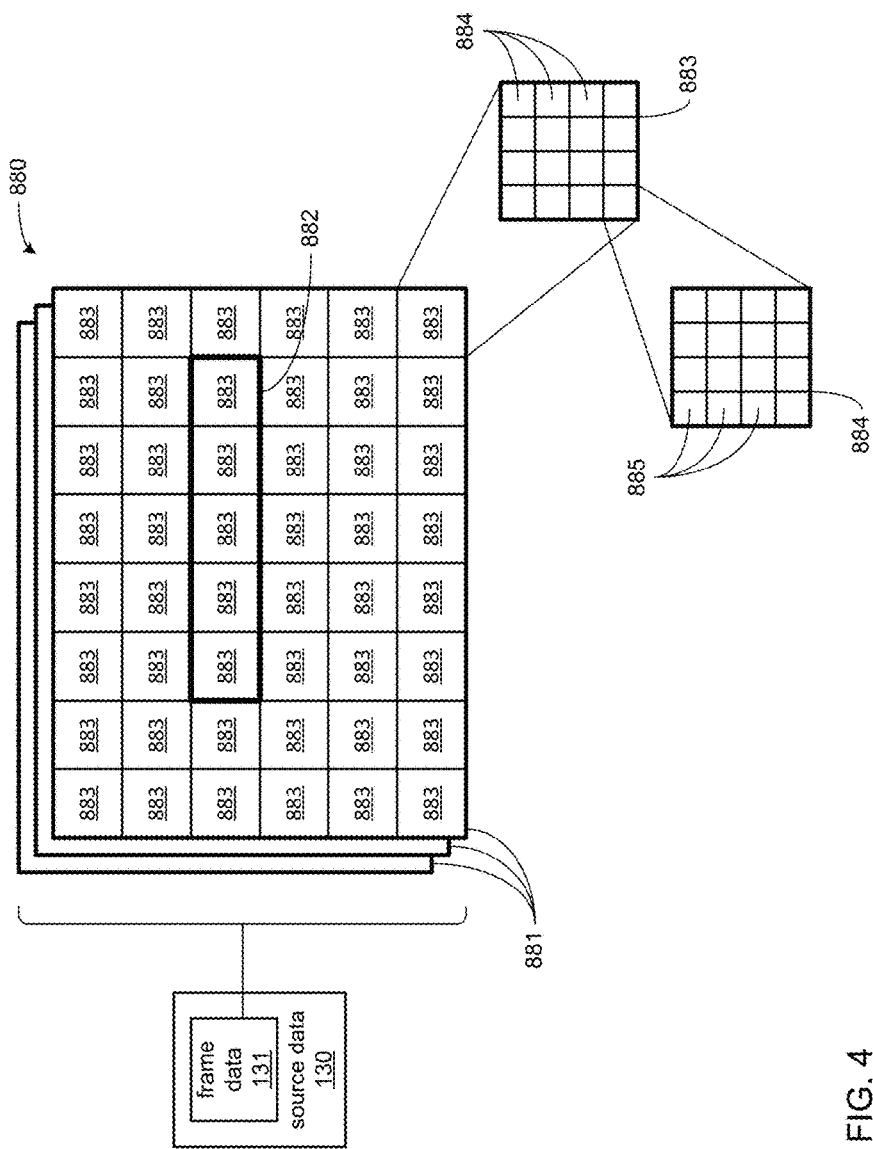
FIG. 4 illustrates a division of a frame of motion video into smaller components.

In executing the frame divider 441, the processor component 450 divides each frame of the motion video 880 into slices, macroblocks and blocks. FIG. 4 depicts an example of such a division of a frame 881 of the motion video imagery 880 in greater detail. As familiar to those skilled in the art video compression, each of the frames 881 is divided into macroblocks 883, and each of the macroblocks 883 is divided into smaller blocks 884. Each of the macroblocks 883 and each of the blocks 884 is made up of a two-dimensional array of pixels 885. Depending on the particular video compression standard employed in compressing the source data 100 (e.g., MPEG, H.26x, etc.), each macroblock 883 may be made up of a 16×16 array of the pixels 885. The 16×16 array of the pixels 885 of each macroblock 883 may be subdivided into a 2×2 array of the blocks 884, each of which may be made up of an 8×8 array of the pixels 885. Alternatively, and as specifically depicted in FIG. 4, the 16×16 array of the pixels 885 of each macroblock 883 may be subdivided into a 4×4 array of the blocks 884, each of which may be made up of a 4×4 array of the pixels 885. It should be noted that different ones of the macroblocks 883 within a single frame may be subdivided into different quantities of blocks 884 of different sizes.

Also depending on the particular video compression standard employed in compressing the source data 100, each frame 881 may also be divided into one or more slices 882, an example of one of which is specifically depicted in FIG. 4. Each slice 882 is made up of one or more of the macroblocks 883 of a single one of the frames 881. It should be noted that no slice 882 includes macroblocks 883 of more than one of the frames 881. More precisely, a single slice 882 may include all of the macroblocks 883 of a single fame 881; may include multiple, but less than all, of the macroblocks 883 of a single frame 881; or may include only one macroblock 883 of a single frame 881.

Returning to FIG. 3, the frame divider 441 may employ any of a variety of techniques to determine the manner in which each frame 881 is to be divided into one or more slices 882. Similarly, the frame divider 441 may employ any of a variety of techniques to determine how many of the blocks 884 each macroblock 883 is to be divided into. Such techniques may examine the pixel colors and/or other characteristics of the pixels 885 within each of the macroblocks 883 in making such determinations. Indications of such determinations concerning each frame 881 may be conveyed as frame parameters from the frame divider 441 to the motion estimator 442.

In executing the motion estimator 442, the processor component 450 compares pixel color values specified in the source data 100 for the pixels 885 of temporally adjacent ones of the frames 881 and/or of adjacent ones of the macroblocks 883 within each of the frames 881 to identify similarities that may be exploited to reduce the data size of the data required to describe each frame 881 in the reduced frame data 230. In response to the degree of changes in color values of the pixels 885 of temporally adjacent frames, different ones of the frames 881 are caused to be represented as intra-frames (I-frames), predicted frames (P-frames) and bi-predicted frames (B-frames). Each I-frame provides a substantially self-contained description of one of the frames 881, each P-frame describes one of the frames 881 as differences from a single other frame 881, and each B-frame describes one of the frames 881 as differences from both another frame 881 that temporally precedes it and still another frame 881 that temporally follows it.

In making comparisons of pixel colors of pixels 885 in adjacent ones of the macroblocks 883 of a single frame 881 (as represented by pixel color values specified in the source data 130), indications of which macroblocks 883 are included in a slice 882 may provide guidance concerning which macroblocks 883 are more likely to have similar pixel color values. As part of reducing data size in generating the reduced frame data 230, motion vectors are generated to enable the pixel color values used to describe pixel colors of pixels 885 of one of the macroblocks 883 to be used to also describe the pixel colors of pixels 885 of another portion of the same frame 881 or of a portion of a temporally adjacent frame 881 to reduce repetition in describing pixel colors.

Figure 5:
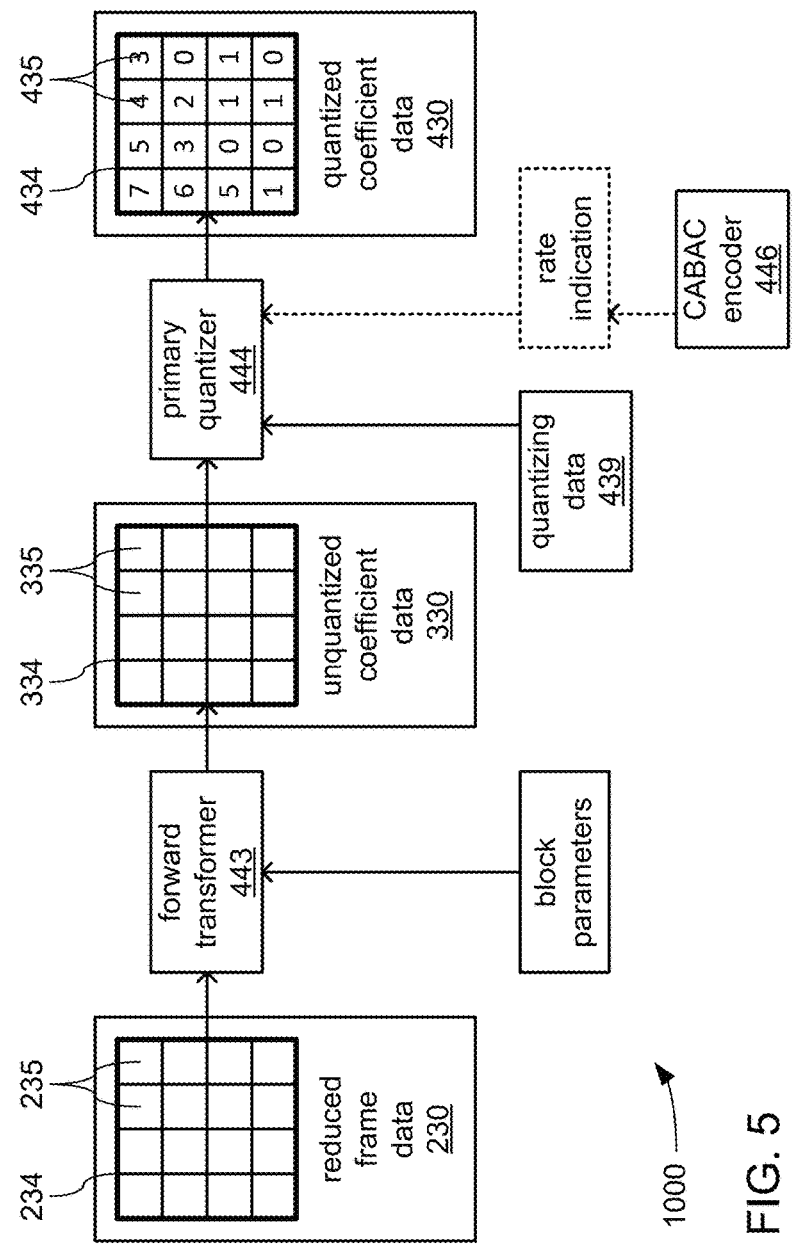
FIGS. 5-6 each illustrate a portion of an embodiment.

In executing the forward transformer 443, the processor component 450 transforms the pixel color values 235 of blocks 234 of the reduced frame data 230 that describe pixel colors of pixels 885 in corresponding blocks 884 of the motion video 880 into similar-sized blocks of coefficients in the frequency domain. FIG. 5 depicts an example of the transformation of an example block 234 of pixel color values 235 of the reduced frame data 230 that represents pixel colors of pixels 885 of a single one of the blocks 884 of a single frame 881 into a corresponding unquantized coefficient block 334 of unquantized coefficients 335 of the unquantized coefficient data 330. In various ones of the more widely used video compression standards, this transform performed by the processor component 450 is a discrete cosine transform (DCT). This transform generating coefficients in the frequency domain is often referred to as a "forward" transform or "forward" DCT to distinguish it from the "inverse" transform or "inverse" DCT (IDCT) later performed during decompression. In performing this transform, an indication of the size of each of the blocks 884 that may have been determined during execution of the frame divider 441, and which dictates the size of each of the corresponding unquantized coefficient blocks 334, may be conveyed to the forward transformer 443 as a block parameter. Alternatively, indications of the size of each of the blocks 884 may be embedded in the reduced frame data 230 as received by the forward transformer 443.

In executing the primary quantizer 444, the processor component 450 quantizes the unquantized coefficients 335 of the unquantized coefficient blocks 334 of the unquantized coefficient data 330 into quantized coefficients 435 of corresponding quantized coefficient blocks 434 of the quantized coefficient data 430. In so doing, the processor component 450 divides each of the unquantized coefficients 335 of an unquantized coefficient block 334 by a corresponding quantization value from a quantization table included in the quantizing data 439. Some of the more widely used video compression standards allow a choice of algorithmic details in performing compression, including whether the unquantized coefficient 335 are all divided by the same quantization value or by differing quantization values. Where differing quantization values are used, each of the quantization values may be specified per location of each of the unquantized coefficients 335 within the unquantized coefficient block 334 by one or more of the more widely used video compression standards. Still further, there may be different single quantization values and/or different sets of differing quantization values for each possible size of the unquantized coefficient blocks 334 (e.g., 2×2, 4×4, 8×8, etc.).

In embodiments where a set of differing quantization values are used (e.g., where the unquantized coefficients 335 within each unquantized coefficient block 334 are not all divided by the same single quantization value), those differing quantization values may be chosen to introduce a graduated pattern of decreasing absolute values among the quantized coefficients 435 of each quantized coefficient block 434. In such embodiments, and as depicted in FIG. 5 with an example set of quantized coefficients 435 in an example quantized coefficient block 434, it is intended that the magnitudes (e.g., the absolute values) of the quantized coefficients 435 positioned towards one corner of the quantized coefficient block 434 (e.g., the upper left-hand corner) are among the greatest in magnitude, while the magnitudes of the absolute values of those towards the diagonally opposite corner are among the least, with a stepped decrease in absolute values proceeding diagonally therebetween. The positions of the quantized coefficients 435 within the quantized coefficient block 434 are interpreted as corresponding to various frequencies, and thus, this graduated pattern of decreasing absolute values indicates that higher frequency components that are less perceptible to the HVS have been removed or at least diminished. It is in this way that visual data deemed unlikely to be missed when later viewed is removed as part of further reducing the overall data size employed in representing the motion video imagery 880. Thus, this quantization performed by the processor component 450 is a deliberately lossy compression technique intended to remove visual information that the HVS is incapable of perceiving, anyway.

Following the division of each of the unquantized coefficients 335 to generate corresponding quotient values, each of those quotient values is rounded to generate the corresponding quantized coefficients 435. In some embodiments, such rounding may be implemented by the addition of a rounding value (e.g., a fractional value such as ⅛, ¼ or ½) to each of the quotient values, followed by truncation of the quotient values to remove the fractional portion, leaving only the integer portion to become the corresponding quantized coefficients 435.

Regardless of whether a single quantization value or a set of multiple quantization values are used in the division of the unquantized coefficients 335 to generate the quotient values, the combination of whatever quantization value(s) and the rounding value used is chosen to instill at least a degree of sparsity among the resulting quantized coefficients 435 of each of the quantized coefficient blocks 434. More precisely, it may be deemed desirable to cause more than one of the quantized coefficients 435 to have a value of zero following the division, the addition of the rounding value and the truncation. As will be explained in greater detail, a larger quantity of zero values among the quantized coefficients 435 results in faster requantization by the trellis quantizer 445 and generation of a more compact video bitstream in the compressed data 630 by the CABAC encoder 446. Indeed, as will also be explained in greater detail, the rounding value may be made dynamically programmable to increase or decrease the quantity of quantized coefficients 435 within each quantized coefficient block 434 having the value of zero to dynamically increase or decrease the video bitstream generated by the CABAC encoder 446.

Figure 6:
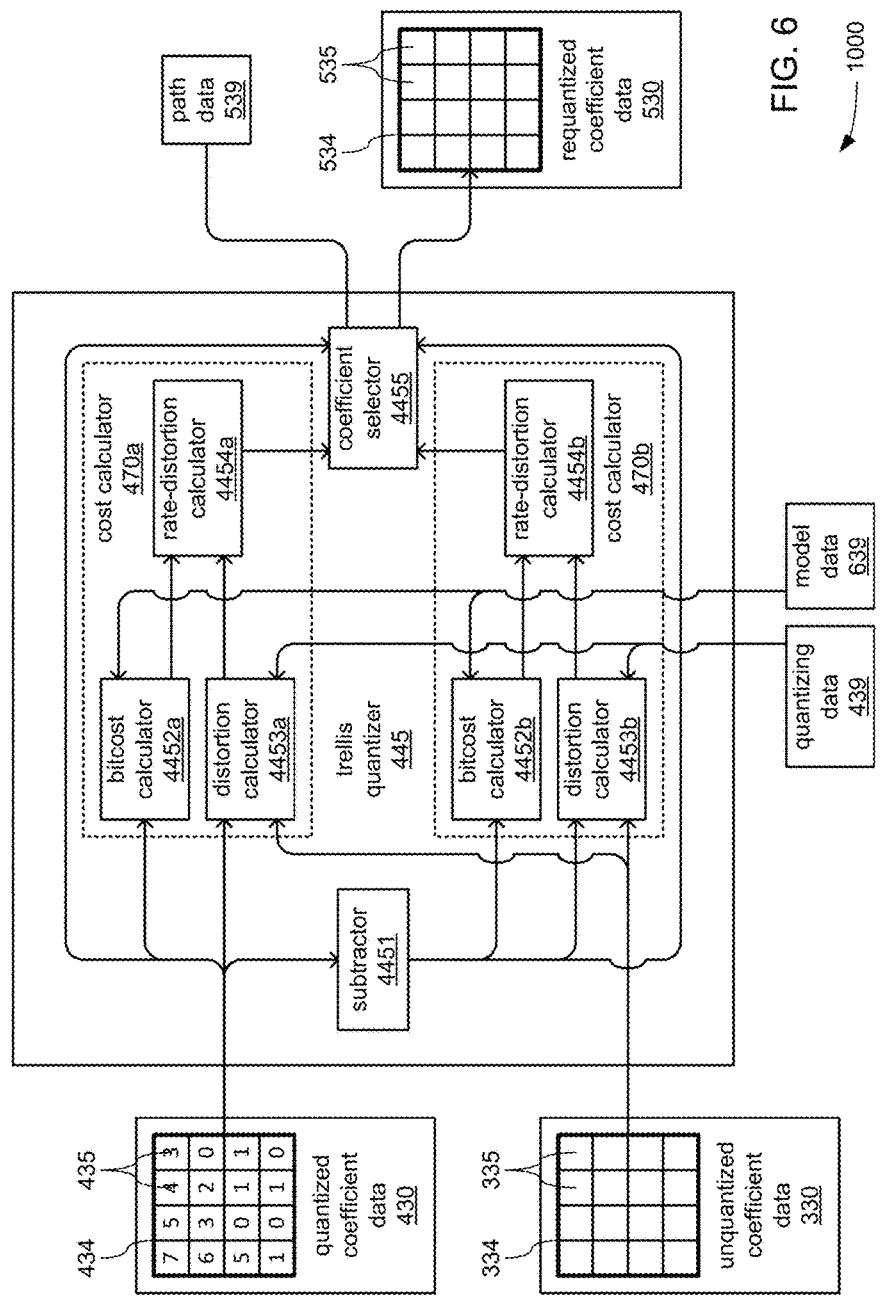

Returning to FIG. 3, the processor component 450, in executing the trellis quantizer 445, subjects the quantized coefficients 435 of the quantized coefficient blocks 434 to a requantization in which alternative values for each of the quantized coefficients 435 are tested to determine if further compression may be achieved through replacement of one or more of the quantized coefficients 435 with alternative values without unacceptably increasing distortion. FIG. 6 depicts an example of operation of an embodiment of the trellis quantizer 445 with the example quantized coefficients 435 of the example quantized coefficient block 434 earlier introduced in FIG. 5 in greater detail. As depicted, the trellis quantizer 445 may incorporate one or more of a subtractor 4451, a pair of bitcost calculators 4452a and 4452b, a pair of distortion calculators 4453a and 4453b, a pair of rate-distortion calculators 4454a and 4454b, and a coefficient selector 4455.

It should be noted that absolute values of the coefficients 335 and 435 are employed in the calculations performed during execution of the trellis quantizer 445 by the processor component 450. Though not depicted in the example quantized coefficients 435, the values of one or more of each of the unquantized coefficients 335 and of the quantized coefficients 435 may be either positive or negative. However, as familiar to those skilled in the art, the fact of one of these coefficients being positive or negative does not have bearing on the reduction of the number of bits (otherwise known as the bitcost) to represent that coefficient in the video bitstream of the compressed data 630, or at least not to as great a degree as the magnitude of the absolute value of that coefficient.

Thus, in executing the trellis quantizer 445, the processor component 450 retrieves each of the quantized coefficients 435 of the example quantized coefficient block 434 introduced in FIG. 5, one at a time, and takes the absolute value of it. In executing the subtractor 4451, that absolute value is subtracted by the value of one to generate an alternate value. The unsubtracted absolute value of each of the quantized coefficients 435 is provided to the bitcost calculator 4452a and the distortion calculator 4453a, while its corresponding alternate value generated by the subtractor 4451 is provided to the bitcost calculator 4452b and the distortion calculator 4453b. Stated differently, bitcost and distortion values are derived for the absolute value of each of the quantized coefficients 434 and for a corresponding alternate value generated by subtracting by a value of one from that absolute value to derive at a rate-distortion (RD) cost for each. The equation employed to determine the RD cost for each of these coefficients and their alternate values may be:

$$\text{RD cost} = \text{distortion} + C\,(\text{bitcost})$$

in which the constant C by which the bitcost value is multiplied before being summed with the distortion value may be selected to set the relative importance of distortion versus bitcost in this calculation. It should be noted that the constant C may vary depending on various factors, including one or more of the size of the block of coefficients (e.g., 2×2, 4×4, 8×8, etc.), whether the same quantization value or differing quantization values were used in the division for quantizing the coefficients of the block, and whether the block of coefficients is part of an intra-macroblock or inter-macroblock (a macroblock in which pixel color values are described as differences from another macroblock of the same frame or from a macroblock of a different frame).

In executing the bitcost calculators 4452a and 4452b, the processor component 450 may retrieve one of multiple CABAC context models from the model data 639 from which the CABAC encoder 446 also retrieves context models. As familiar to those skilled in the art, CABAC encoders employ a set of context models that each represent a different set of relative frequencies at which various values of coefficients to be encoded by a CABAC encoder may occur in a set of coefficients representing visual imagery that is received by that CABAC encoder. A set of CABAC context models may be specified in one or more of the more widely used video compression standards, and the model data 639 may include those specified context models. As also familiar to those skilled in the art, CABAC encoders are typically meant to be provided with an indication of which context model to use as an initial context model at the start of encoding of at least each frame, if not also each slice. During operation of a CABAC encoder, the selection of context models changes as encoding proceeds, each change reflecting a change in frequency of occurrence of each possible coefficient value as actually encountered by the CABAC encoder. In other words, a CABAC encoder updates its context model of relative frequencies of each possible coefficient value as each coefficient value is retrieved and encoded, and it is in this way that a CABAC encoder is adaptive.

The trellis quantizer 445 may receive the same indication of which context model to employ as the initial context model at the start of encoding at least each frame 881, if not also at the start of encoding of each slice 882, that the CABAC encoder 446 receives. This indication may be conveyed by the frame divider 441 as a slice parameter generated as a result of analysis of each frame 881 of the motion video 880. Since the CABAC encoder 446 will encode values that occur more frequently with lesser quantities of bits, the indications of relative frequencies of occurrence of each possible value among the quantized coefficients 435 provides an indication of the relative bitcost of each possible value of the quantized coefficients 435 and of each possible value of their corresponding alternative values generated by the subtractor 4451. However, to reduce processing and/or storage requirements, the trellis quantizer 445 may not receive and use these updates in context models made by the CABAC encoder 446. Thus, the one of the context models indicated as the initial context model to both the trellis quantizer 445 and the CABAC encoder 446 is employed by the trellis quantizer 445 continues to be employed by the trellis quantizer 445 until a new indication of an initial context model is received. Given that these indications of what context model is selected as an initial context model are provided before feedback of actual bitcosts can be generated by the CABAC encoder 446, the indicated initial context models represent estimated models such that the trellis quantizer 445 employs an estimate of the bitcosts of each possible value.

This lack of use of actual bitcosts determined by the CABAC encoder 446 may be deemed desirable since it removes the delay incurred in awaiting such feedback to be generated by and received from the CABAC encoder 446. As familiar to those skilled in the art, compensating for the imposition of such a delay arising from the use of such feedback often requires an increase in processing and/or storage resources to cause one or more components employed in the video compression to operate faster. Instead, the trellis quantizer 445 may simply retrieve and use indications of relative frequencies provided by the same context model for multiple coefficients until an indication of an new selection of an initial context model is received.

In executing the distortion calculators 4453a and 4453b, the processor component 450 may retrieve the quantization value(s) used by the primary quantizer 444 in dividing each of the unquantized coefficients 335 as part of generating the quantized coefficients 435 as previously described (regardless of whether the unquantized coefficients 335 were all divided by the same quantization value or differing quantization values). The fact of each of the unquantized coefficients 335 having been divided by a quantization value during execution of the primary quantizer 444 as part of deriving the quantized coefficients 435 must be compensated for in preparation for calculating distortion values. Thus, the distortion calculators 4453a and 4453b may multiply the quantized coefficients 435 and their corresponding alternative values by the quantization value(s). Alternatively, the distortion calculators may divide each of the unquantized coefficients 335 by the quantization value(s).

With such compensation for the earlier quantization division performed, execution of the distortion calculator 4453a by the processor component 450 results in the processor component 450 calculating a distortion value for each of the quantized coefficients 435. To do so, the processor component 450 may compute a squared difference between each of the quantized coefficients 435 and its corresponding one of the unquantized coefficients 335. Correspondingly, execution of the distortion calculator 4453b by the processor component 450 results in the processor component 450 calculating the distortion for the corresponding alternate values generated by the subtractor 4451 from each of the quantized coefficients 435. To do so, the processor component 450 may compute a squared difference between each of those alternate values and its corresponding one of the unquantized coefficients 335.

In executing the rate-distortion calculators 4454a and 4454b, the processor component 450 derives the RD cost for each of the quantized coefficients 435 and its corresponding alternate value generated by the subtractor 4451. More precisely, the execution of the rate-distortion calculator 4454a by the processor component 450 results in the processor component multiplying the bitcost value from the bitcost calculator 4452a with the constant C, and then adding the result of that multiplication to the distortion value from the distortion calculator 4453a to derive the RD cost of each of the quantized coefficients 435. Correspondingly, the execution of the rate distortion calculator 4454b by the processor component 450 results in the processor component multiplying the bitcost value from the bitcost calculator 4452b with the constant C, and then adding the result of that multiplication to the distortion value from the distortion calculator 4453b to derive the RD cost of one of the alternate values generated by the subtractor 4451 for each of the quantized coefficients 435.

In executing the coefficient selector 4455, the processor component 450 receives the RD costs from the rate-distortion calculators 4454a and 4454b for each of the quantized coefficients 435 and its alternate. As the RD costs are received for each quantized coefficient 435 and its corresponding alternate value, the processor component 450 adds these RD costs to each of the possible combinations of quantized coefficients 435 and corresponding alternates that might precede the current quantized coefficient 435 and current corresponding alternate value to accrue an overall cost for each such possible combination. Upon receipt of the RD cost for the last of the quantized coefficients 435 and its corresponding alternate value, the processor component selects the combination of quantized coefficients 435 and alternate values that has the lowest overall cost to become the requantized coefficients 535 of a corresponding requantized coefficient block 534 of the requantized coefficient data 530.

It should be noted that ones of the quantized coefficients 434 with a value of zero are skipped in the performance of such concurrent calculation of bitcost, distortion and RD cost calculations. This arises from the fact that there is no lower absolute value than the absolute value of zero. Therefore, as each zero value coefficient is encountered, it is selected to be employed as the coefficient value for the corresponding one of the requantized coefficients 535 without such calculations.

Figure 7:
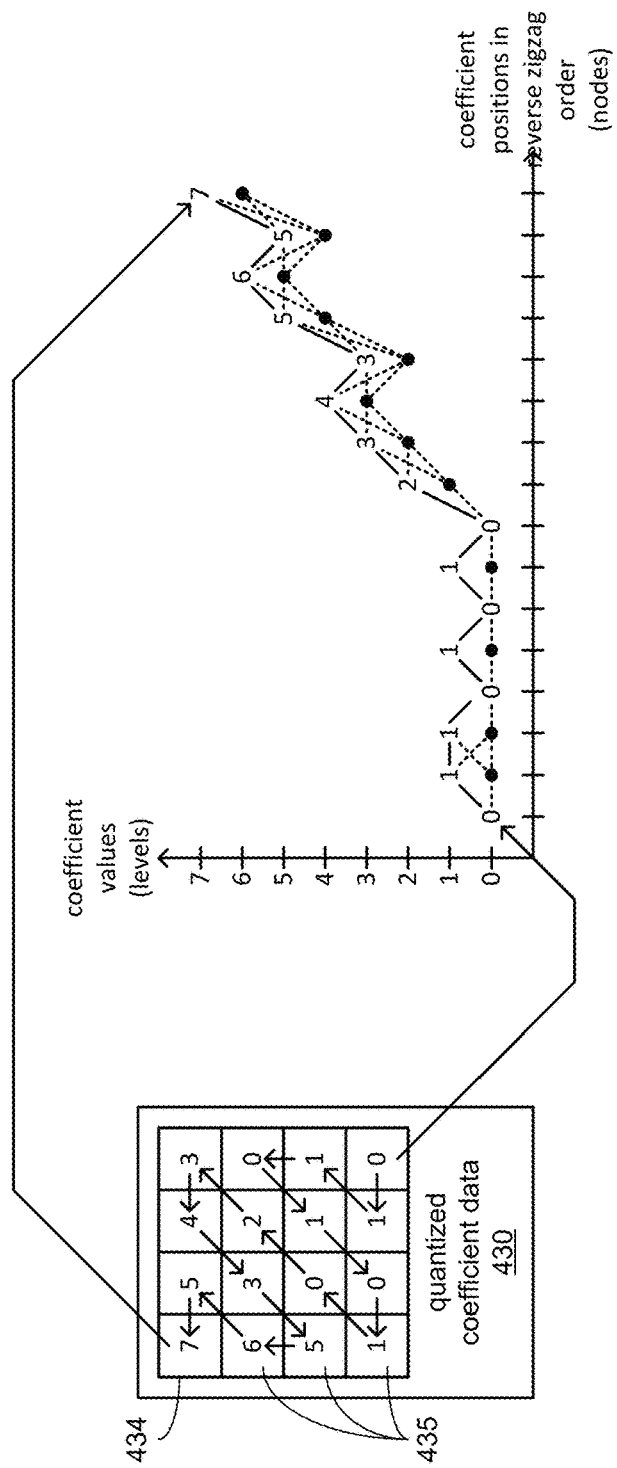
FIG. 7 illustrates an embodiment of trellis quantization.

FIG. 7 depicts this same example of operation of an embodiment of the trellis quantizer 445 in a graphical manner and in still more detail. As depicted, the order in which the quantized coefficients 435 are retrieved from the example quantized coefficient block 434 may be a reverse zigzag order that may proceed generally from the lower right-hand corner to the upper left-hand corner. As familiar to those skilled in the art, this reverse zigzag order proceeds in the opposite general direction as the zigzag order typically used in the entropy encoding performed by CABAC encoders or other entropy encoders. In embodiments in which the unquantized coefficients 335 of each unquantized coefficient block 334 are divided by a set of differing quantization values that causes the quantized coefficients 435 of each corresponding quantized coefficient block 434 to exhibit a pattern of higher magnitude coefficients at the upper left-hand corner diminishing to one or more zero value coefficients at the lower right-hand corner, the use of a reverse zigzag order results in those zero value coefficients being the first ones retrieved.

The retrieval of the example quantized coefficients 435 in this reverse zigzag order is shown along one axis of the depicted trellis graph (proceeding in a left-to-right direction along that axis). The other axis is of the absolute values of quantized coefficients 435. The term "trellis" in the term "trellis quantization" arises from the fact that a graphical depiction of the possible choices of absolute values of coefficients tested in trellis quantization (such as those tested by the trellis quantizer 445) resembles the latticework of a garden trellis when drawn in graphical form as is done in FIG. 7. Solid lines are drawn between the absolute values of the sixteen retrieved example quantized coefficients 435 to depict the "path" of choices of absolute values of coefficients earlier derived through execution of the primary quantizer 444. Stated differently, the solid lines depict the path denoting the combination of choices of coefficient values already made by the primary quantizer 444. Dark spots beneath the non-zero absolute values depict the alternate values derived by the subtraction of one from each of those non-zero absolute values by the subtractor 4451. Dotted lines depict segments of possible alternate pathways corresponding to numerous other possible combinations of choices of coefficient values that may be derived by the trellis quantizer 445 in determining what the corresponding requantized coefficients 535 should be. In other words, for the depicted example quantized coefficients 435, the depicted latticework of solid and dotted lines graphically presents all of the possible paths representing all of the possible combinations of coefficient values that may be derived by the trellis quantizer 445, including the path of the combination of coefficient values already made by the primary quantizer 444. Thus, as made clear in this graphical depiction, it is entirely possible that the trellis quantizer 445 may re-derive the very same path of the very same choices in coefficient values already made by the primary quantizer 444.

Proceeding in the depicted reverse zigzag order, which corresponds to proceeding left-to-right along the trellis graph, each pair of a non-zero coefficient value and corresponding alternate value represents a choice of two possible directions in which to proceed from all of the other possible combinations of choices (and corresponding pathways) that could precede that pair. Thus, as recognizable to those skilled in the art, each such pair doubles the number of possible pathways that could be taken on the way to the next node at which there may be another pair of a coefficient value and an alternate value to choose from.

As execution of the coefficient selector 4455 by the processor component 450 leads to the processor component 450 proceeding through the quantized coefficients 435 in reverse zigzag order (i.e., left-to-right along the depicted trellis graph), the processor component 450 stores indications of the doubling number of possible pathways representing the growing set of possible combinations of choices of coefficient values as the path data 539. Along with these indications of possible pathways, the processor component 450 also stores an indication of the overall cost of using the combination of coefficient values represented by each pathway. Each of these overall costs represents an accrual (e.g., a sum) of the RD costs of all of the coefficient value choices that make up the pathway to which each overall cost corresponds. The fact of there being a concurrent calculation of RD costs for each of the quantized coefficients 435 having a non-zero value and its corresponding alternate enables the provision of pairs of RD costs to be added to the accrual of overall costs for each of the possible pathways stored in the path data 539, thereby greatly increasing the speed with which such accrual calculations to derive overall costs are able to be performed.

However, as also previously discussed, no alternate value is derived for ones of the quantized coefficients 435 that have a zero value. Thus, there is no choice between coefficient values to be made where quantized coefficients 435 having a zero value are encountered. Accordingly, this means that there is no doubling of possible combinations of choices of coefficient values arising from zero value coefficients, and no doubling of indications of possible pathways stored as part of the path data 539. In effect, each of the quantized coefficients 435 having a zero value actually results in a "neck" in the trellis graph through which all of the possible pathways representing all of the possible combinations of choices of coefficient values must pass. In response to this, as previously discussed, the aforedescribed concurrent calculation of bitcost, distortion and RD cost values is skipped for where these zero value coefficients are encountered.

Once all of the quantized coefficients 435 of the depicted example quantized coefficient block 434 have been retrieved, and calculations and accruals of RD costs for each non-zero one of the quantized coefficients 435 has been performed, the processor component 450 examines the indications of overall costs for all of the possible pathways indicated in the path data 539, and selects the pathway (and its corresponding combination of choices of coefficient values) that has the lowest overall cost. That combination of choices of coefficient values then becomes the requantized coefficient values 535 of the corresponding requantized coefficient block 534 in the requantized coefficient data 530 to be provided to the CABAC encoder 446.

Returning to FIG. 6, it should be noted that the bitcost calculator 4452a, the distortion calculator 4453a and the rate-distortion calculator 4454a may form a first pipeline executed or operated substantially concurrently with a second pipeline formed by the bitcost calculator 4452b, the distortion calculator 4453b and the rate-distortion calculator 4454b. As previously discussed, these first and second pipelines may be implemented with circuitry such as the circuitry implementing the cost calculators 470a and 470b, respectively, which may be incorporated into the processor component 450 or another portion of circuitry of the computing device 300.

Figure 8:
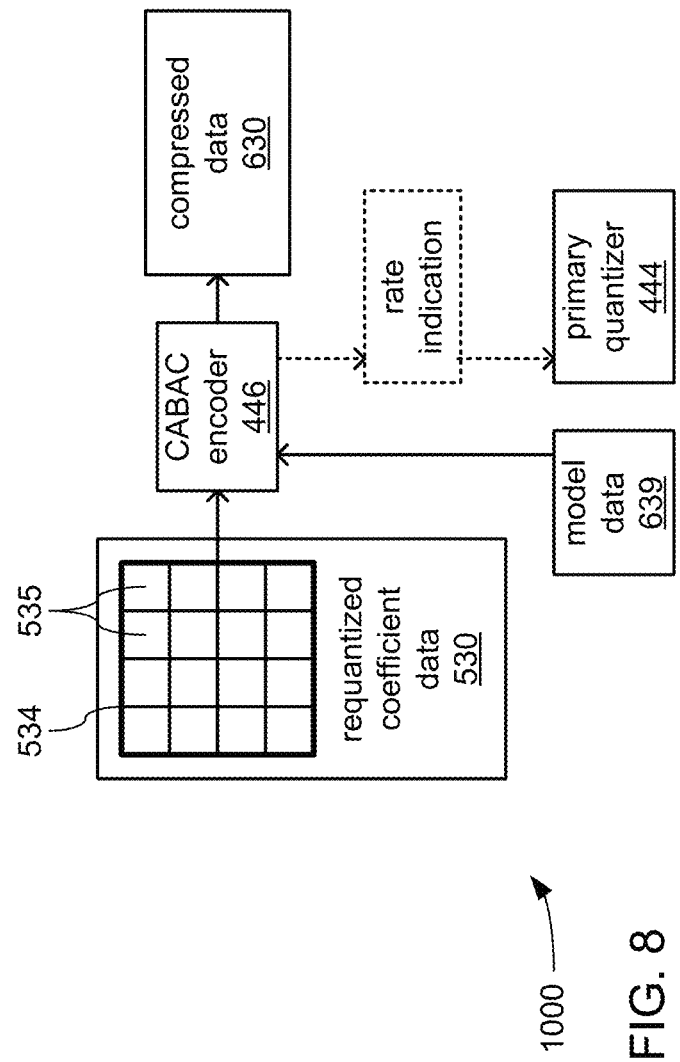
FIGS. 8-11 each illustrate a portion of an embodiment.

Returning to FIG. 3, the processor component 450, in executing the CABAC encoder 446, subjects the requantized coefficients 535 of the requantized coefficient blocks 534 of the requantized coefficient data 530 to entropy encoding to achieve further compression and to generate the video bitstream of the compressed data 630 that represents the motion video 880 in compressed form. FIG. 8 depicts an example of the entropy encoding of a single requantized coefficient block 534 into a portion of the compressed data 630. As previously discussed, in executing the CABAC encoder 446, the processor component 450 retrieves various ones of multiple context models stored as part of the model data 639, starting with an initial selection of a context model that may be indicated in a slice parameter conveyed from the frame divider 441.

Figure 9:
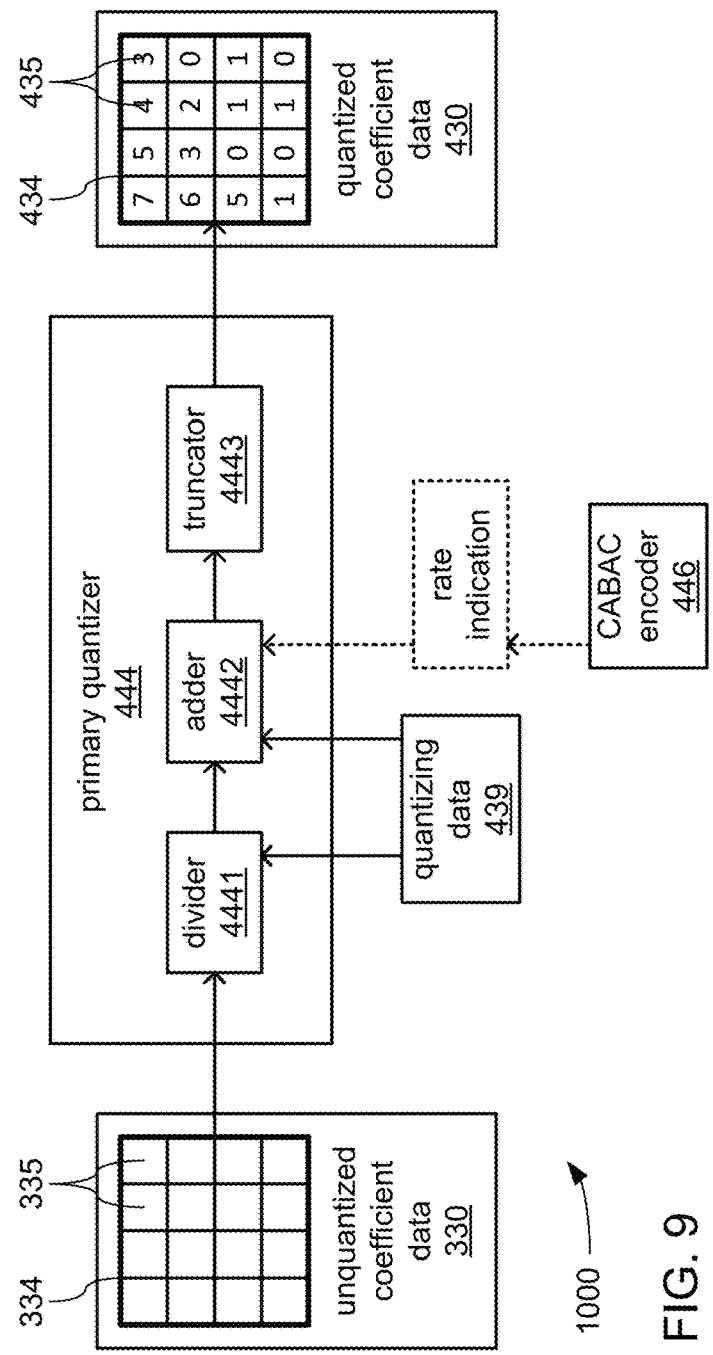

Returning again to FIG. 3, indications of a bitrate at which the compressed data 630 is generated by execution of the CABAC encoder (otherwise known as the bitcost) may be provided to the primary quantizer 444 as a rate indication. In some embodiments, the processor component 450, in executing the primary quantizer 444, may alter a scaling factor employed with the quantization value(s) by which unquantized coefficients 335 of the unquantized coefficient data 330 are divided in response to the rate indication. Alternatively or additionally, the processor component 450 may alter the rounding value added to the quotient values generated by that division and prior to their truncation to derive quantized coefficients 435 of the quantized coefficient data 430. FIG. 9 depicts this possible use of such a rate indication by the primary quantizer 444 in greater detail. As depicted, the primary quantizer 444 may incorporate one or more of a divider 4441, an adder 4442 and a truncator 4443.

In executing the divider 4441, the processor component 450 divides each of the unquantized coefficients 335 of one of the unquantized coefficient blocks 334 either by corresponding quantization parameters of a quantization table retrieved from the quantizing data 439 or by a single quantization value retrieved from the quantizing data 439 to generate corresponding quotient values. In executing the adder 4442, the processor component 450 adds a rounding value that may be selected from among multiple rounding values that may be retrieved from the quantizing data 439 to each of the quotients generated by execution of the divider 4441. In executing the truncator 4443, the processor component 450 may truncate each of the quotients following the addition of the rounding value to remove the fractional portion of each, and thereby generate quantized coefficients 435 that correspond to the unquantized coefficients 335 originally provided to the divider 4441.

At the start of compression of each frames 881, if not also at the start of compression of each slice 882, the processor component 450 may alter the rounding value added to each of the quotients by the adder 4442. The processor component 450 may increase the rounding value to cause more of the resulting quantized coefficients 435 to have non-zero values following truncation or may decrease the rounding value to cause fewer of the resulting quantized coefficients 435 to have non-zero values if the bitrate is determined by the processor component 450 to be outside a specified range of bitrates. More non-zero values among the quantized coefficients 435 would lead to more pairs of quantized coefficient values and alternate values for the trellis quantizer 445 to make a selection between, thereby increasing the processing requirements for the trellis quantizer 445 per quantized coefficient block 434. This would also likely lead to a greater quantity of non-zero coefficient values being selected by the trellis quantizer 445 for use in each requantized coefficient block 534, thereby likely increasing the quantity of bits required to describe the coefficient values selected by the trellis quantizer 445 in the video bitstream generated by the CABAC encoder 446 as part of generating the compressed data 630, and thus, the bitcost would increase. Correspondingly, more zero values among the quantized coefficients 435 would lead to more opportunities for the trellis quantizer 445 to skip calculating bitcosts, distortion and RD cost values, thereby decreasing the processing requirements of the trellis quantizer 445 per quantized coefficient block 434. This would also likely lead to a lesser quantity of non-zero coefficient values being selected by the trellis quantizer 445 for use in each requantized coefficient block 534, thereby likely decreasing the quantity of bits required to describe the coefficient values selected by the trellis quantizer 445 in the video bitstream generated by the CABAC encoder 446, and thus, the bitcost would decrease.

Alternatively or additionally, the processor component 450 may alter a scaling factor employed in the division performed during execution of the divider 4441.

Returning to FIG. 1, in various embodiments, the display device 600 (if present) incorporates one or more of a processor component 650, a storage 660, a display 680 and an interface 690 to couple the display device 600 to the network 999. The storage 660 stores a control routine 640 and the compressed data 630. The control routine 640 incorporates a sequence of instructions operative on the processor component 650 in its role as a main processor component of the display device 600 to implement logic to perform various functions. In executing the control routine 640 in some embodiments, the processor component 650 may receive the compressed data 630 representing the motion video 880 from the computing device 300, may decompress it, and may visually present it on the display 680.

Figure 2:
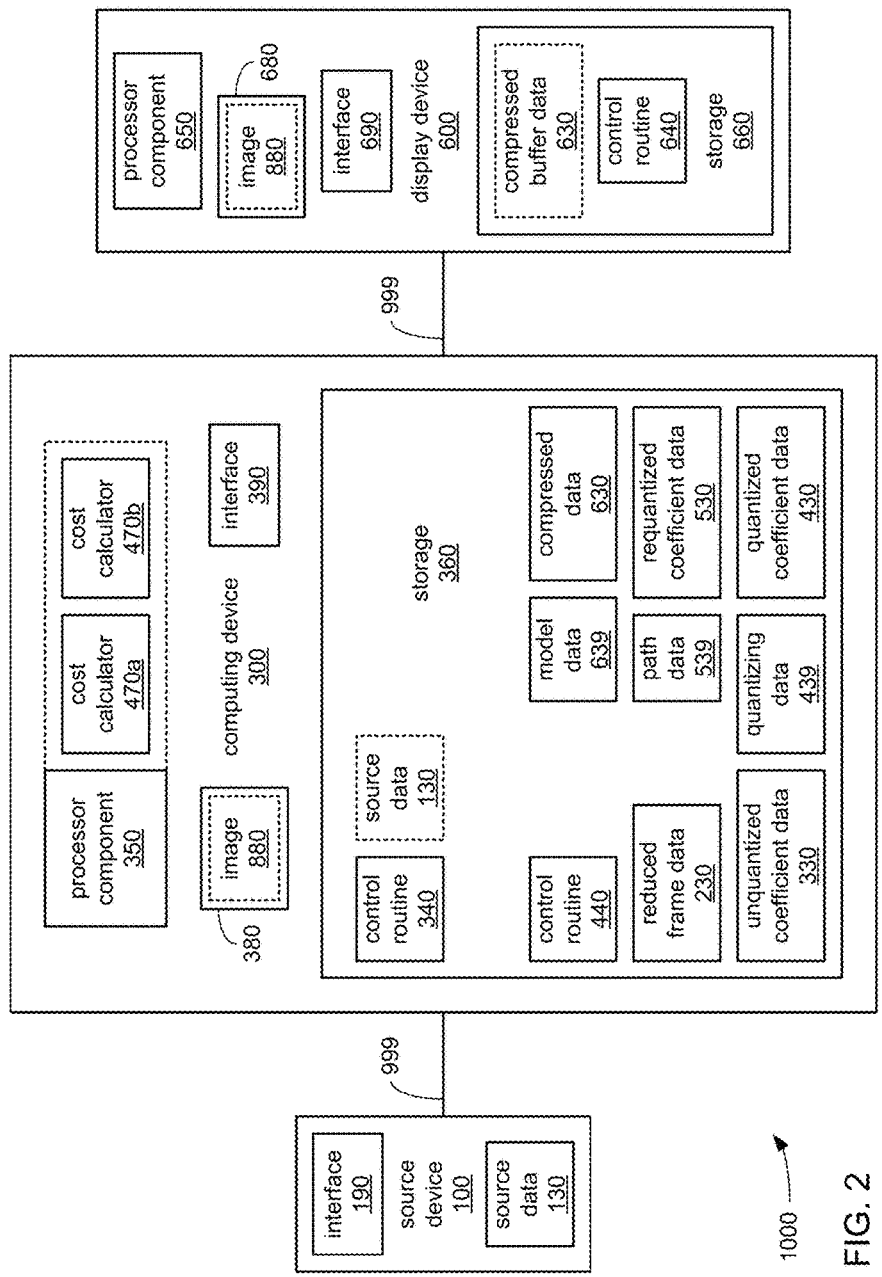
FIG. 2 illustrates an alternate embodiment of a video processing system.

FIG. 2 illustrates a block diagram of an alternate embodiment of the video processing system 1000 that includes an alternate embodiment of the computing device 300. The alternate embodiment of the video presentation system 1000 of FIG. 2 is similar to the embodiment of FIG. 1 in many ways, and thus, like reference numerals are used to refer to like elements throughout. However, unlike the computing device 300 of FIG. 1, the computing device 300 of FIG. 2 does not incorporate the controller 400. Thus, unlike the computing device 300 of FIG. 1, in the computing device 300 of FIG. 2, it is the processor component 350 that executes the control routine 440 in lieu of there being a processor component 450 to do so, and it is the processor component 350 that may incorporate circuitry-based implementations of the cost calculators 470a and 470b. Therefore, in the alternate embodiment of the video presentation system 1000 of FIG. 2, the processor component 350 may compress the source data 130 to generate the compressed data 630.

In various embodiments, each of the processor components 350, 450 and 650 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350, 450 and 650 may include any of a variety of types of processor, it is envisioned that the processor component 450 of the controller 400 (if present) may be somewhat specialized and/or optimized to perform tasks related to graphics and/or video. More broadly, it is envisioned that the controller 400 embodies a graphics subsystem of the computing device 300 to enable the performance of tasks related to graphics rendering, video compression, image rescaling, etc., using components separate and distinct from the processor component 350 and its more closely related components.

In various embodiments, each of the storages 360, 460 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 10:
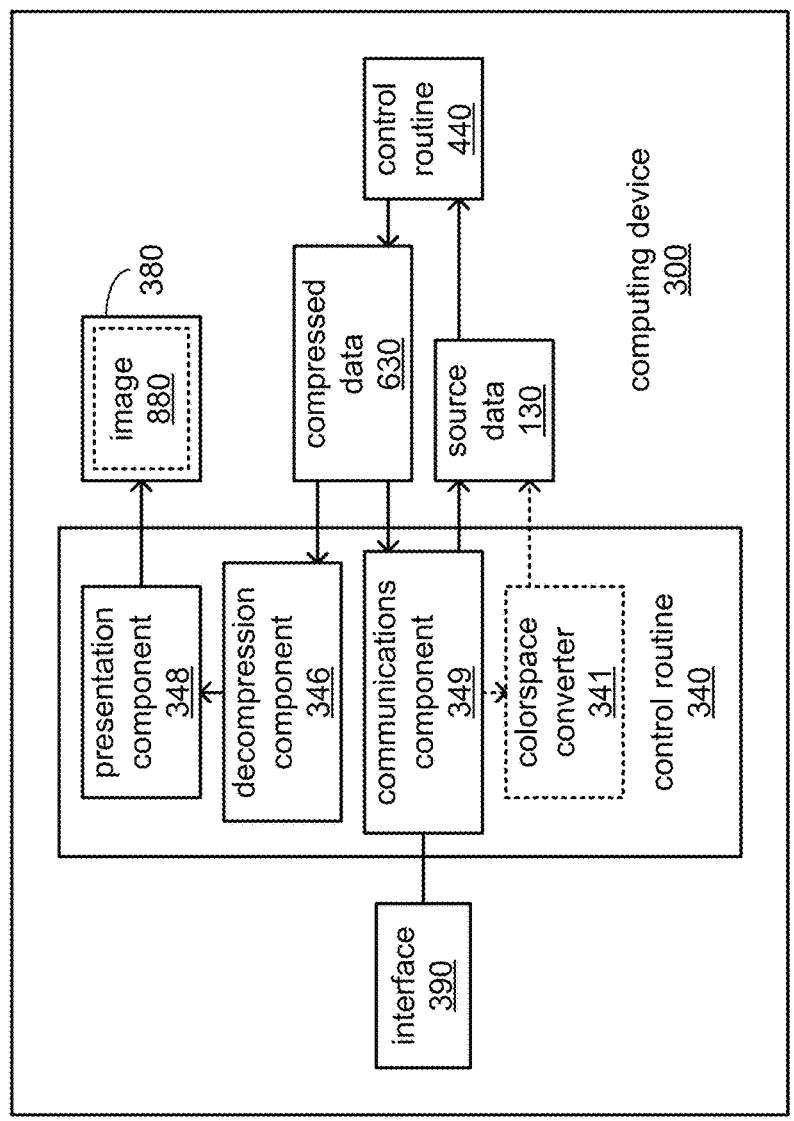
Figure 11:
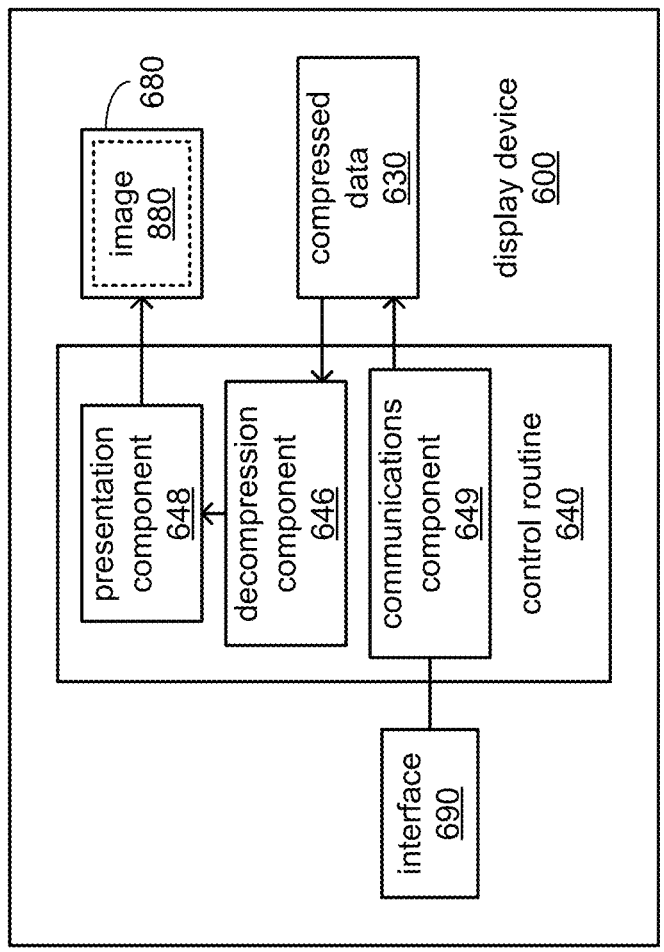

FIGS. 10 and 11 each illustrate a block diagram of a portion of an embodiment of the video processing system 1000 of either FIG. 1 or FIG. 2 in greater detail. More specifically, FIG. 10 depicts aspects of the operating environment of the computing device 300 in which the processor components 350 and/or 450, in executing the control routines 340 and/or 440, compress the source data 130 representing the motion video 880 to generate the compressed data 630. FIG. 11 depicts aspects of the operating environment of the display device 600 in which the processor component 650, in executing the control routine 640, decompresses and visually presents the motion video 880 on the display 680. As recognizable to those skilled in the art, the control routines 340, 440 and 640, including the components of which each is composed, are selected to be operative on whatever type of processor or processors that are selected to implement applicable ones of the processor components 350, 450 or 650.

In various embodiments, each of the control routines 340, 440 and 640 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350, 450 or 650. Where one or more device drivers are included, those device drivers may provide support for any of a variety of other components, whether hardware or software components, of corresponding ones of the computing devices 300 or 600, or the controller 400.

The control routines 340 or 640 may include a communications component 349 or 649, respectively, executable by whatever corresponding ones of the processor components 350 or 650 to operate corresponding ones of the interfaces 390 or 690 to transmit and receive signals via the network 999 as has been described. Among the signals received may be signals conveying the source data 130 and/or the compressed data 630 among one or more of the computing devices 100, 300 or 600 via the network 999. As will be recognized by those skilled in the art, each of these communications components is selected to be operable with whatever type of interface technology is selected to implement corresponding ones of the interfaces 390 or 690.

The control routines 340 or 640 may include a decompression component 346 or 646, respectively, executable by whatever corresponding ones of the processor components 350 or 650 to decompress the compressed data 630. As has been discussed, the compressed data 630 may have been generated from the source data 130 for purposes of storage and/or for purposes of transmission to another device.

The control routines 340 or 640 may include a presentation component 348 or 648, respectively, executable by whatever corresponding ones of the processor components 350 or 650 to operate corresponding ones of the displays 380 or 680 to visually present the motion video 880. As has been discussed, such presentation of the motion video 880 may entail decompressing the compressed data 630 representing it.

Turning more specifically to FIG. 10, the control routine 340 may include a color space converter 341 executable by the processor component 350 to convert the color space of the source data 130. In embodiments in which the control routine 440 compresses the source data 130 in a manner conforming to one of the more widely used video compression standards (e.g., a version of MPEG or of H.26x), the color space converter 341 (if present) may convert the color space of the source data 130 to a luminance-chrominance (YUV) color space from another color space in preparation for such video compression.

Figure 12:
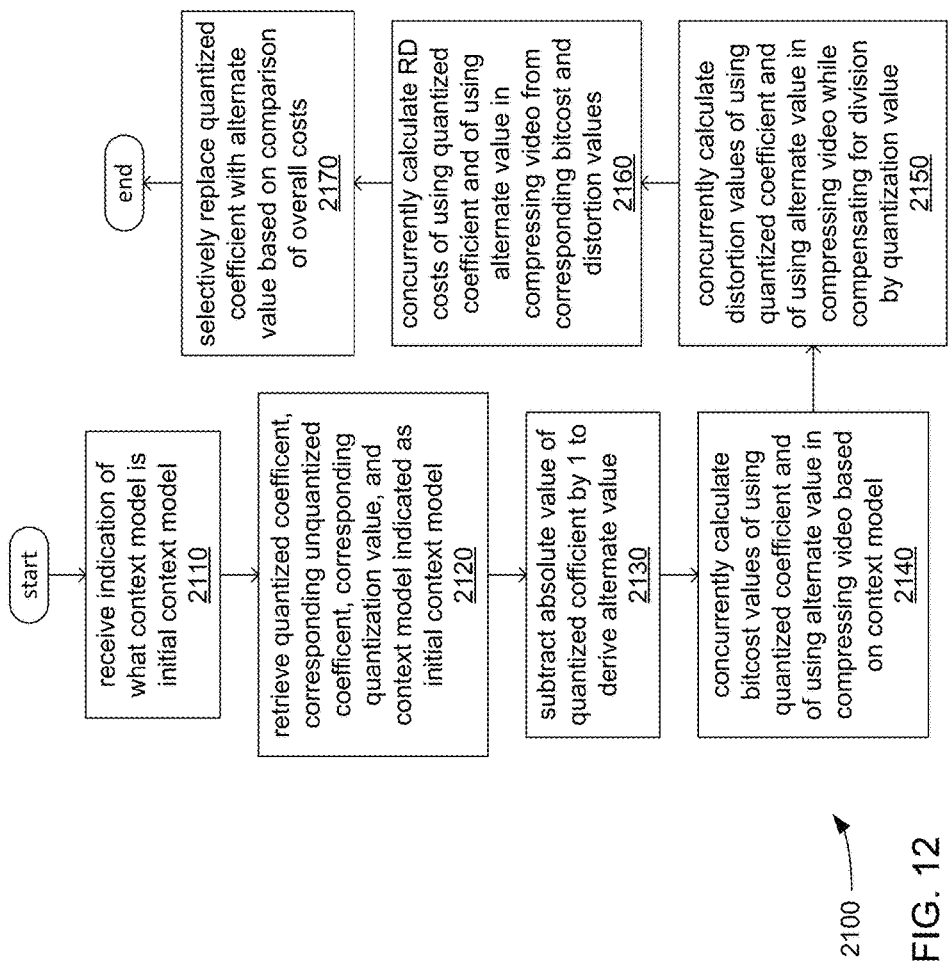
FIGS. 12-13 each illustrate a logic flow according to an embodiment.

FIG. 12 illustrates one embodiment of a logic flow 2100. The logic flow 2100 may be representative of some or all of the operations executed by one or more embodiments described herein. More specifically, the logic flow 2100 may illustrate operations performed by the processor component 350 or 450 in executing at least the control routine 440, and/or performed by other component(s) of the computing device 300 or the controller 400, respectively.

At 2110, a processor component of a computing device (e.g., either the processor component 350 of the computing device 300, or the processor component 450 of the controller 400) receives an indication of which one of multiple context models employed by a CABAC encoder is the initial context model. As previously discussed, a CABAC encoder uses and updates multiple context models as it performs entropy encoding of coefficients.

At 2120, a quantized coefficient, a corresponding unquantized coefficient, a corresponding quantization value and the context model indicated as the initial context model are retrieved. As previously discussed, the quantized coefficient is generated from the unquantized coefficient by division with a quantization value and then rounded, and the rounding may entail addition with a rounding value followed by truncation. At 2130, the absolute value of the quantized coefficient is subtracted by a value of one to generate a corresponding alternate value.

At 2140, the bitcost values of using the quantized coefficient and of using the alternate value in compressing a video are concurrently calculated. As previously discussed, these concurrent calculations are at least partly based on the context model indicated as the initial context model, and not updated or replaced for purposes of such bitcost calculations until another indication is received of another context model being designated as an initial context model.

At 2150, the distortion values of using the quantized coefficient and of using the alternate value in compressing a video are concurrently calculated. At previously discussed, these concurrent calculations may employ squared difference calculations, one between the quantized and unquantized coefficients, and the other between the alternate value and the unquantized coefficient. Further, as also previously discussed, the quantization value used in the division to generate the quantized coefficient from the unquantized coefficient may be employed to compensate for the fact of that division having occurred.

At 2160, the RD costs of using the quantized coefficient and of using the alternate value in compressing a video are concurrently calculated. As previously discussed, these concurrent calculations entail a summation of the bitcost and distortion values, one with the bitcost and distortion values associated with the quantized coefficient, and the other with the bitcost and distortion values associated with the alternate value. As also previously discussed, one or the other of the bitcost value or the distortion value in each of these concurrent calculations may be multiplied (or otherwise adjusted or modified) with a constant selected to achieve a desired balance in weighting the bitcost and distortion values relative to each other.

At 2170, the quantized coefficient is selectively replaced by the alternate value based on a comparison of overall costs of multiple possible combinations of selections of quantized coefficients and alternate values calculated from accruals of the results of the calculations performed at 2140 through 2160 for each pair of those quantized coefficients and alternate values. As has been discussed, the quantized coefficient may be replaced by the alternate value if the alternate value is part of a combination of coefficient values and alternate values that achieves the lowest overall cost in compressing the video.

Figure 13:
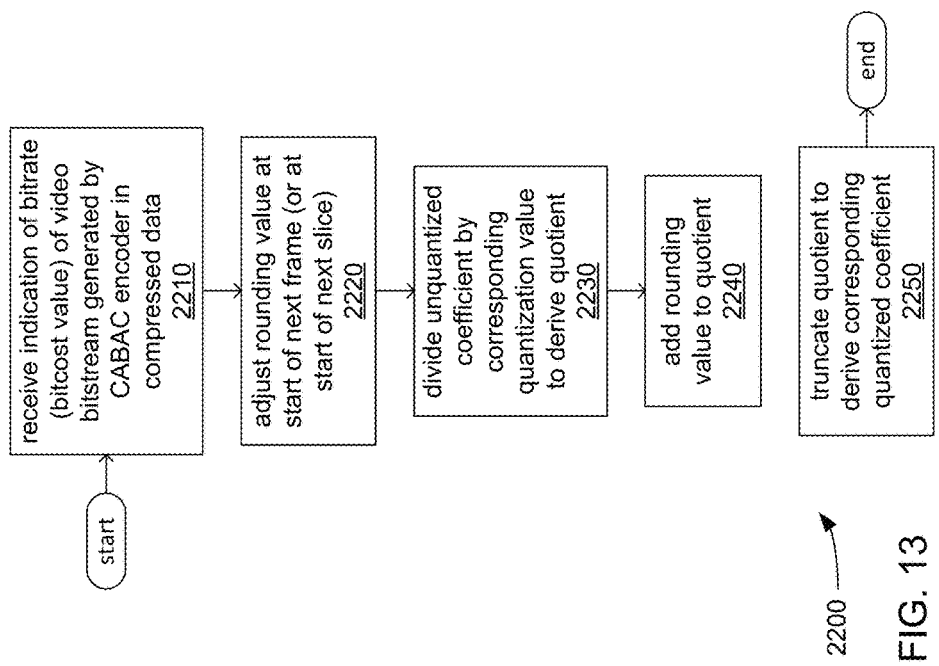

FIG. 13 illustrates one embodiment of a logic flow 2200. The logic flow 2200 may be representative of some or all of the operations executed by one or more embodiments described herein. More specifically, the logic flow 2200 may illustrate operations performed by the processor component 350 or 450 in executing at least the control routine 440, and/or performed by other component(s) of the computing device 300 or the controller 400, respectively.

At 2210, a processor component of a computing device (e.g., either the processor component 350 of the computing device 300, or the processor component 450 of the controller 400) receives an indication of a bitrate (also referred to herein as the bitcost value) of the video bitstream generated by a CABAC encoder in compressing a video. As has been discussed, the term "bitcost" refers to the bitrate of a video bitstream generated as part of compressed data representing a motion video (e.g., the motion video 880).

At 2220, a rounding value employed in quantizing unquantized coefficients to generate quantized coefficients as part of compressing the video is modified in response to the indication of bitrate. As previously discussed, the rounding value may be increased to cause more of the resulting quantized coefficients to have non-zero values following truncation if the bitrate is determined to be too low, or the rounding value may decreased to cause more of the resulting quantized coefficients to have the value of zero following truncation if the bitrate is determined to be too high.

At 2230, an unquantized coefficient is divided by a quantization value to generate a quotient. At 2240, the rounding value is added to the quotient. At 2250, the quotient is truncated to remove the fractional portion and to generate a corresponding quantized coefficient.

Figure 14:
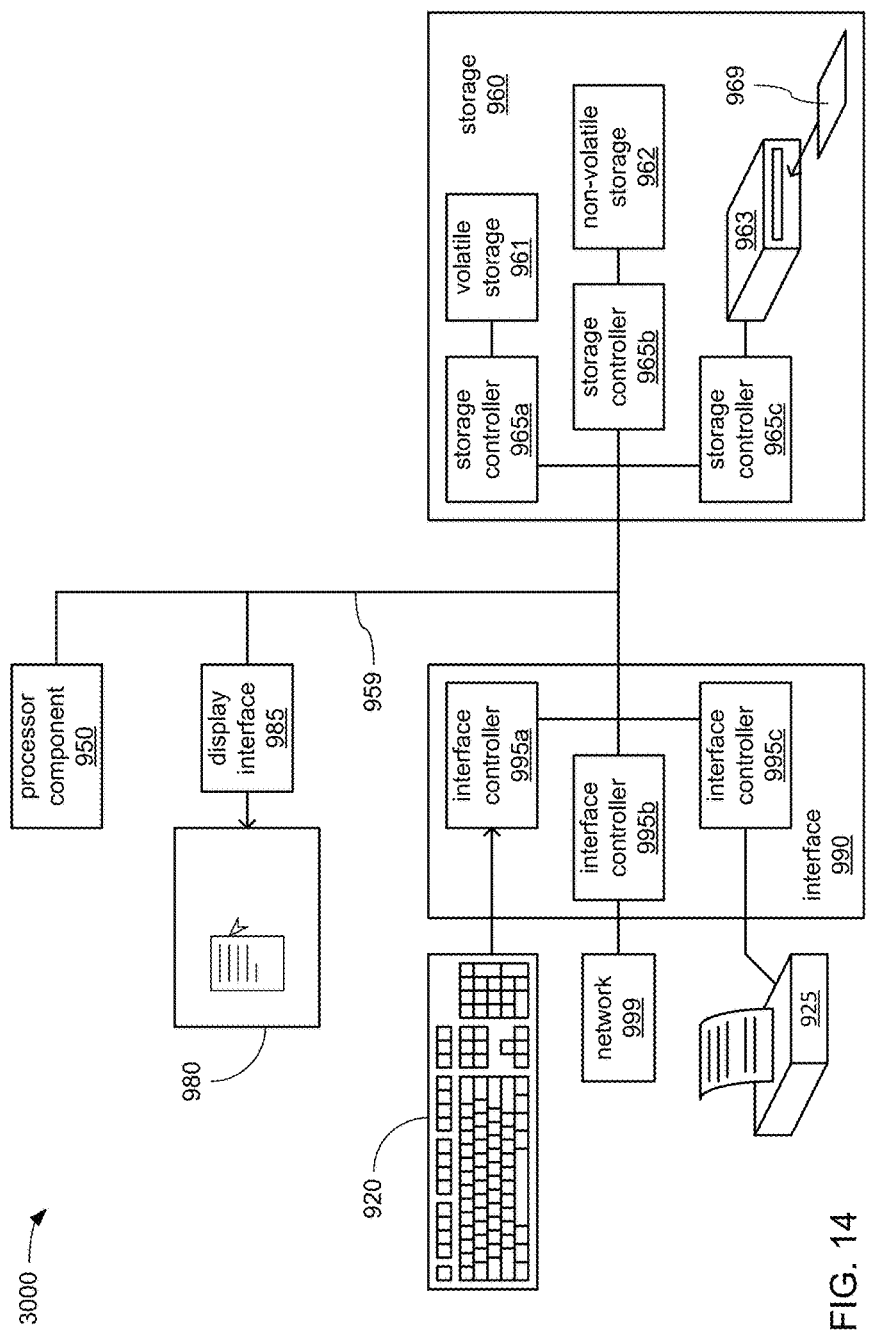
FIG. 14 illustrates a processing architecture according to an embodiment.

FIG. 14 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 600, and/or as part of the controller 400. It should be noted that components of the processing architecture 3000 are given reference numbers in which the last two digits correspond to the last two digits of reference numbers of at least some of the components earlier depicted and described as part of the computing devices 100, 300 and 600, as well as the controller 400. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350, 450 and 650) may include any of a wide variety of commercially available processors, employing any of a wide variety of technologies and implemented with one or more cores physically combined in any of a number of ways.

As previously discussed, the storage 960 (corresponding to the storages 360, 460 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 15:
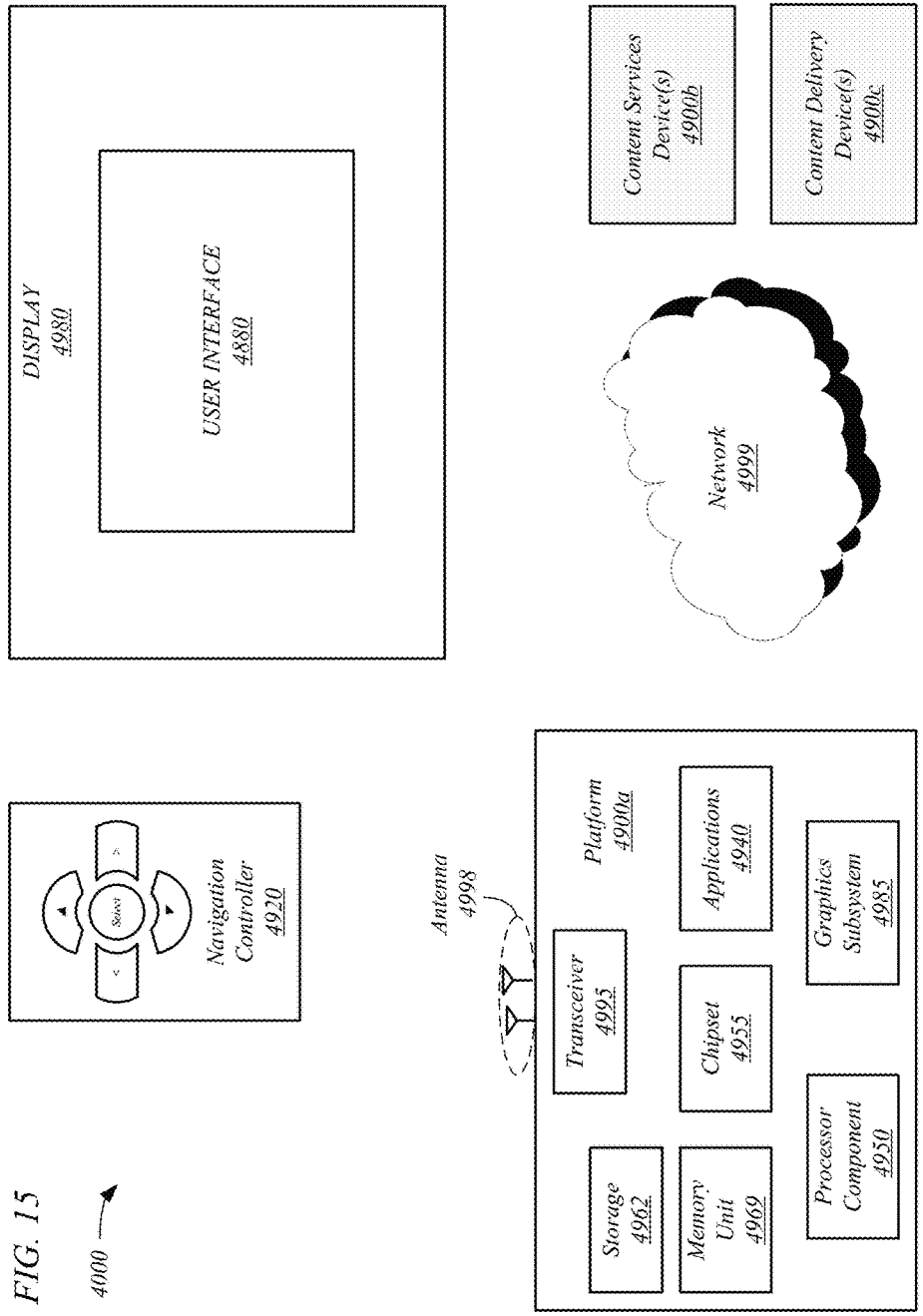
FIG. 15 illustrates another alternate embodiment of a graphics processing system.

FIG. 15 illustrates an embodiment of a system 4000. In various embodiments, system 4000 may be representative of a system or architecture suitable for use with one or more embodiments described herein, such as the graphics processing system 1000; one or more of the computing devices 100, 300 or 600; and/or one or more of the logic flows 2100 or 2200. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 15 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 150, 350, 450 or 650, and/or to processor component 950 of FIG. 14.

Memory unit 4969 may be implemented using any machine-readable or computer-readable media capable of storing data, and may be the same as or similar to storage media 969 of FIG. 14.

Transceiver 4995 may include one or more radios capable of transmitting and receiving signals using various suitable wireless communications techniques, and may be the same as or similar to transceiver 995b in FIG. 14.

Display 4980 may include any television type monitor or display, and may be the same as or similar to one or more of displays 380 and 680, and/or to display 980 in FIG. 14.

Storage 4962 may be implemented as a non-volatile storage device, and may be the same as or similar to non-volatile storage 962 in FIG. 14.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900*a* may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
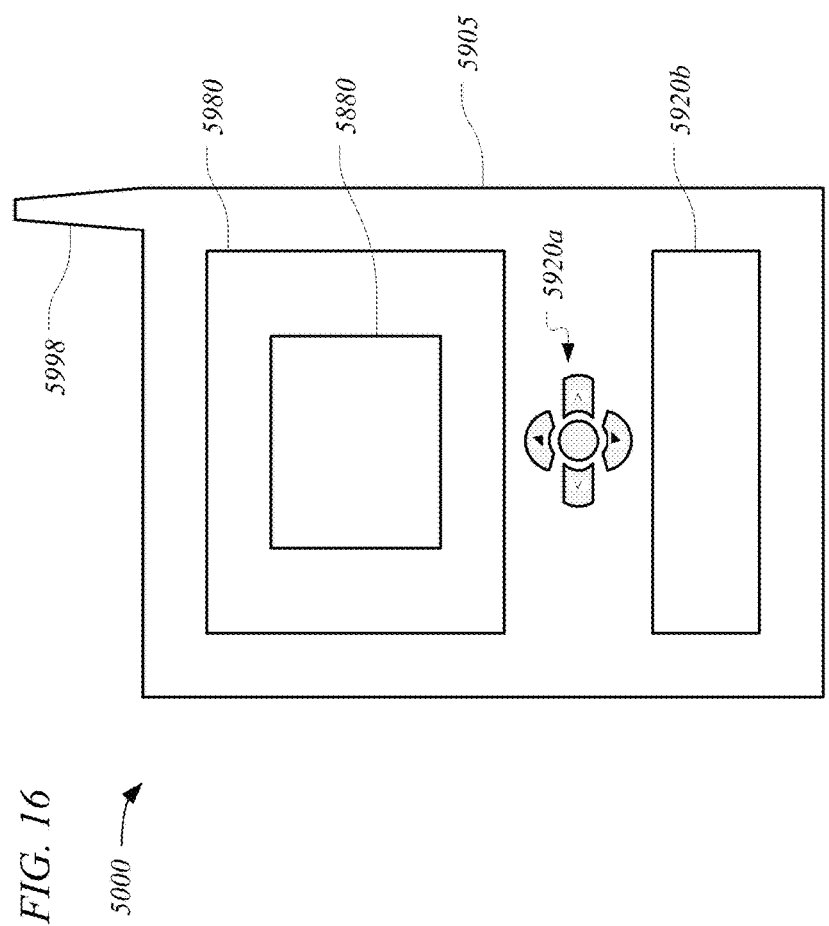
FIG. 16 illustrates an embodiment of a device.

As described above, system 4000 may be embodied in varying physical styles or form factors. FIG. 16 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 5000 may include a display 5980, a navigation controller 5920*a*, a user interface 5880, a housing 5905, an I/O device 5920*b*, and an antenna 5998. Display 5980 may include any suitable display unit for displaying information appropriate for a mobile computing device, and may be the same as or similar to display 4980 in FIG. 15. Navigation controller 5920*a* may include one or more navigation features which may be used to interact with user interface 5880, and may be the same as or similar to navigation controller 4920 in FIG. 15. I/O device 5920*b* may include any suitable I/O device for entering information into a mobile computing device. Examples for I/O device 5920*b* may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to compress motion video includes a first cost calculator to derive a first bitcost value of using a quantized coefficient of a quantized coefficient block of a frame of a video in compressing the video, the first bitcost value based on a context model of a context-adaptive binary arithmetic coder (CABAC); and a second cost calculator to derive a second bitcost value of replacing the quantized coefficient with an alternate value derived from the quantized coefficient in compressing the video, the second bitcost value based on the context model.

In Example 2, which includes the subject matter of Example 1, the device may include a subtractor to subtract a value of one from an absolute value of the quantized coefficient to derive the alternate value.

In Example 3, which includes the subject matter of any of Examples 1-2, the first cost calculator may derive a first distortion value of using the quantized coefficient in compressing the video based at least in part on an unquantized coefficient of an unquantized coefficient block of the frame, and the second cost calculator may derive a second distortion value of using the alternate value in compressing the video based at least in part on the unquantized coefficient, the unquantized coefficient block corresponding to the quantized coefficient block in the frame and the quantized coefficient derived from the unquantized coefficient through quantization of the unquantized coefficient block.

In Example 4, which includes the subject matter of any of Examples 1-3, the first distortion value may be derived from a squared difference between the quantized coefficient and the unquantized coefficient, and the second distortion value may be derived from a squared difference between the alternate value and the unquantized coefficient.

In Example 5, which includes the subject matter of any of Examples 1-4, the first cost calculator may derive a first rate-distortion (RD) cost from a sum of the first bitcost value and the first distortion value, and the second cost calculator may derive a second RD cost from a sum of the second bitcost value and the second distortion value.

In Example 6, which includes the subject matter of any of Examples 1-5, the device may include a coefficient selector to selectively replace the quantized coefficient with the alternate value in compressing the video based on a comparison of at least a first overall cost of using a first combination of quantized coefficients and alternate values associated with the quantized coefficient block in compressing the video and a second combination of quantized coefficients and alternate values associated with the quantized coefficient block in compressing the video, the first combination comprising the quantized coefficient, the second combination comprising the alternate value, the first overall cost comprising the first RD cost, and the second overall cost comprising the second RD cost.

In Example 7, which includes the subject matter of any of Examples 1-6, the device may include a primary quantizer to divide the unquantized coefficient by a quantization value to derive a quotient, and to add a rounding value to and truncate the quotient to derive the quantized coefficient.

In Example 8, which includes the subject matter of any of Examples 1-7, the primary quantizer may alter the rounding value in response to an indication received from the CABAC of a bitcost of a video bitstream resulting from compression of the video.

In Example 9, which includes the subject matter of any of Examples 1-8, the device may include a processor component to execute the first cost calculator and the second cost calculator concurrently.

In Example 10, which includes the subject matter of any of Examples 1-9, the device may include a processor component, the processor component comprising the first and second cost calculators, the first and second cost calculators operated concurrently.

In Example 11, which includes the subject matter of any of Examples 1-10, the device may include the CABAC; and a trellis quantizer, the trellis quantizer comprising the first cost calculator and the second cost calculator, the trellis quantizer to retrieve the context model from among multiple context models based on an indication of the context model as an initial context model received by the CABAC and the trellis quantizer.

In Example 12, which includes the subject matter of any of Examples 1-11, the device may include at least one of a display to visually present the video or an interface to transmit the video to a display device via a network following compression of the video.

In Example 13, a device to compress motion video includes a primary quantizer to divide an unquantized coefficient of an unquantized coefficient block of a frame of a video by a quantization value to derive a quotient, and to add a rounding value to and truncate the quotient to derive a quantized coefficient of a quantized coefficient block that corresponds to the unquantized coefficient block; and a context-adaptive binary arithmetic coder (CABAC) to convey an indication to the primary quantizer of a bitcost of a video bitstream resulting from compressing the video, the primary quantizer to alter the rounding in response to the indication.

In Example 14, which includes the subject matter of Example 13, the device may include a first cost calculator to derive a first bitcost value of using the quantized coefficient in compressing the video, the first bitcost value based on a context model of the CABAC; and a second cost calculator to derive a second bitcost value of replacing the quantized coefficient with an alternate value derived from the quantized coefficient in compressing the video, the second bitcost value based on the context model.

In Example 15, which includes the subject matter of any of Examples 13-14, the first cost calculator may derive a first distortion value of using the quantized coefficient in compressing the video based at least in part on the unquantized coefficient, and the second cost calculator may derive a second distortion value of using the alternate value in compressing the video based at least in part on the unquantized coefficient.

In Example 16, which includes the subject matter of any of Examples 13-15, the first cost calculator may derive a first rate-distortion (RD) cost from a sum of the first bitcost value and the first distortion value, and the second cost calculator may derive a second RD cost from a sum of the second bitcost value and the second distortion value.

In Example 17, which includes the subject matter of any of Examples 13-16, the device may include a coefficient selector to selectively replace the quantized coefficient with the alternate value in compressing the video based on a comparison of at least a first overall cost of using a first combination of quantized coefficients and alternate values associated with the quantized coefficient block in compressing the video and a second combination of quantized coefficients and alternate values associated with the quantized coefficient block in compressing the video, the first combination comprising the quantized coefficient, the second combination comprising the alternate value, the first overall cost comprising the first RD cost, and the second overall cost comprising the second RD cost.

In Example 18, which includes the subject matter of any of Examples 13-17, the device may include a processor component to execute the first cost calculator and the second cost calculator concurrently.

In Example 19, which includes the subject matter of any of Examples 13-18, the device may include a processor component, the processor component comprising the first and second cost calculators, the first and second cost calculators operated concurrently.

In Example 20, which includes the subject matter of any of Examples 13-19, the device may include a at least one of a display to visually present the video or an interface to transmit the video to a display device via a network following compression of the video.

In Example 21, a computing-implemented method for compressing motion video images includes deriving a first bitcost value of using a quantized coefficient of a quantized coefficient block of a frame of a video in compressing the video, the first bitcost value based on a context model of a context-adaptive binary arithmetic coder (CABAC); deriving a second bitcost value of replacing the quantized coefficient with an alternate value derived from the quantized coefficient in compressing the video, the second bitcost value based on the context model; and selectively replacing the quantized coefficient with the alternate value in compressing the video based on a comparison of at least the first and second bitcost values.

In Example 22, which includes the subject matter of Example 21, the method may include subtracting a value of one from an absolute value of the quantized coefficient to derive the alternate value.

In Example 23, which includes the subject matter of any of Examples 21-22, the method may include deriving a first distortion value of using the quantized coefficient in compressing the video based at least in part on an unquantized coefficient of an unquantized coefficient block of the frame, the unquantized coefficient block corresponding to the quantized coefficient block in the frame and the quantized coefficient derived from the unquantized coefficient through quantization of the unquantized coefficient block; and deriving a second distortion value of using the alternate value in compressing the video based at least in part on the unquantized coefficient.

In Example 24, which includes the subject matter of any of Examples 21-23, the method may include deriving the first distortion value from a squared difference between the quantized coefficient and the unquantized coefficient; and deriving the second distortion value from a squared difference between the alternate value and the unquantized coefficient.

In Example 25, which includes the subject matter of any of Examples 21-24, the method may include deriving a first overall cost of using a first combination of quantized coefficients and alternate values associated with the quantized coefficient block in compressing the video from a sum of at least the first bitcost value and the first distortion value, the first combination comprising the quantized coefficient; deriving a second overall cost of using a second combination of quantized coefficients and alternate values associated with the quantized coefficient block in compressing the video from a sum of at least the second bitcost value and the second distortion value, the second combination comprising the alternate value; and selectively replacing the quantized coefficient with the alternate value in compressing the video based on a comparison of the first and second overall costs.

In Example 26, which includes the subject matter of any of Examples 21-25, the method may include dividing the unquantized coefficient by a quantization value to derive a quotient; adding a rounding value to the quotient; and truncating the quotient to derive the quantized coefficient.

In Example 27, which includes the subject matter of any of Examples 21-26, the method may include altering the rounding value in response to an indication from the CABAC of a bitcost of a video bitstream resulting from compression of the video.

In Example 28, which includes the subject matter of any of Examples 21-27, the method may include deriving the first and second bitcosts concurrently.

In Example 29, which includes the subject matter of any of Examples 21-28, the method may include retrieving the context model from among multiple context models based on an indication provided to the CABAC of the context model as an initial context model.

In Example 30, which includes the subject matter of any of Examples 21-29, the method may include at least one of visually presenting the video on a display or transmitting the video to a display device via a network following compression of the video.

In Example 31, at least one machine-readable storage medium includes instructions that when executed by a computing device, cause the computing device to derive a first bitcost value of using a quantized coefficient of a quantized coefficient block of a frame of a video in compressing the video, the first bitcost value based on a context model of a context-adaptive binary arithmetic coder (CABAC); derive a second bitcost value of replacing the quantized coefficient with an alternate value derived from the quantized coefficient in compressing the video, the second bitcost value based on the context model; and selectively replace the quantized coefficient with the alternate value in compressing the video based on a comparison of at least the first and second bitcost values.

In Example 32, which includes the subject matter of Example 31, the computing device may be caused to subtract a value of one from an absolute value of the quantized coefficient to derive the alternate value.

In Example 33, which includes the subject matter of any of Examples 31-32, the computing device may be caused to derive a first distortion value of using the quantized coefficient in compressing the video based at least in part on an unquantized coefficient of an unquantized coefficient block of the frame, the unquantized coefficient block corresponding to the quantized coefficient block in the frame and the quantized coefficient derived from the unquantized coefficient through quantization of the unquantized coefficient block; and derive a second distortion value of using the alternate value in compressing the video based at least in part on the unquantized coefficient.

In Example 34, which includes the subject matter of any of Examples 31-33, the computing device may be caused to derive the first distortion value from a squared difference between the quantized coefficient and the unquantized coefficient; and derive the second distortion value from a squared difference between the alternate value and the unquantized coefficient.

In Example 35, which includes the subject matter of any of Examples 31-34, the computing device may be caused to derive a first overall cost of using a first combination of quantized coefficients and alternate values associated with the quantized coefficient block in compressing the video from a sum of at least the first bitcost value and the first distortion value, the first combination comprising the quantized coefficient; derive a second overall cost of using a second combination of quantized coefficients and alternate values associated with the quantized coefficient block in compressing the video from a sum of at least the second bitcost value and the second distortion value, the second combination comprising the alternate value; and selectively replace the quantized coefficient with the alternate value in compressing the video based on a comparison of the first and second overall costs.

In Example 36, which includes the subject matter of any of Examples 31-35, the computing device may be caused to divide the unquantized coefficient by a quantization value to derive a quotient; add a rounding value to the quotient; and truncate the quotient to derive the quantized coefficient.

In Example 37, which includes the subject matter of any of Examples 31-36, the computing device may be caused to alter the rounding value in response to an indication from the CABAC of a bitcost of a video bitstream resulting from compression of the video.

In Example 38, which includes the subject matter of any of Examples 31-37, the computing device may be caused to derive the first and second bitcosts concurrently.

In Example 39, which includes the subject matter of any of Examples 31-38, the computing device may be caused to retrieve the context model from among multiple context models based on an indication provided to the CABAC of the context model as an initial context model.

In Example 40, which includes the subject matter of any of Examples 31-39, the computing device may be caused to transmit the video to a display device following compression of the video.

In Example 41, at least one machine-readable storage medium may include instructions that when executed by a computing device, cause the computing device to perform any of the above.

In Example 42, an apparatus to compress motion video may include means for performing any of the above.

What is claimed is:

1. A device to compress motion video comprising:
   a processor circuit;
   a memory storing instructions which when executed by the processor circuit cause the processor circuit to:
      concurrently derive, based on a context model of a context-adaptive binary arithmetic coder (CABAC), the context model retrieved from among multiple context models based on an indication provided to the CABAC of the context model as an initial context model:
         a first bitcost value of using a quantized coefficient of a quantized coefficient block of a first frame of a video in compressing the video; and
         a second bitcost value of replacing the quantized coefficient with an alternate value derived by subtracting a value of one from an absolute value of the quantized coefficient in compressing the video; and
      a first bitcost value and a second bitcost value for a second frame of the video as estimated bitcost values using the context model of the CABAC without incurring a delay to receive a new context model of the multiple context models as a new initial context model and without the CABAC generating actual bitcost values for the second frame, the first bitcost value for the second frame derived using a quantized coefficient of a quantized coefficient block of the second frame, the second bitcost value to replace the quantized coefficient of the quantized coefficient block of the second frame with an alternate value derived from quantized coefficient of the quantized coefficient block of the second frame; and
      store source data representing the video in a storage.

2. The device of claim 1, the memory storing instructions which when executed by the processor circuit cause the processor circuit to:
   derive a first distortion value of using the quantized coefficient of the quantized coefficient block of the first frame in compressing the video based at least in part on an unquantized coefficient of an unquantized coefficient block of the first frame; and
   derive a second distortion value of using the alternate value in compressing the video based at least in part on the unquantized coefficient, the unquantized coefficient block corresponding to the quantized coefficient block of the first frame and the quantized coefficient derived from the unquantized coefficient through quantization of the unquantized coefficient block.

3. The device of claim 2, the first distortion value derived from a squared difference between the quantized coefficient of the quantized coefficient block of the first frame and the unquantized coefficient, and the second distortion value derived from a squared difference between the alternate value and the unquantized coefficient.

4. The device of claim 1, comprising at least one of a display to visually present the video or an interface to transmit the video to a display service via a network following compression of the video.

5. The device of claim 1, the memory storing instructions which when executed by the processor circuit cause the processor circuit to:
   receive the indication of the new context model of the multiple context models based on an indication provided to the CABAC of the new context model as the new initial context model;
   derive a first bitcost value for a third frame of the video using a quantized coefficient of a quantized coefficient block of the third frame of the video based on the new context model of the CABAC; and
   derive a second bitcost value for the third frame of the video based on the new context model of the CABAC, the second bitcost value for replacing the quantized coefficient of the quantized coefficient block of the third frame with an alternate value derived from quantized coefficient of the quantized coefficient block of the third frame.

6. A device to compress motion video comprising:
a processor circuit;
a memory storing instructions which when executed by the processor circuit cause the processor circuit to:
divide an unquantized coefficient of an unquantized coefficient block of a first frame of a video by a quantization value to derive a quotient, and to add a rounding value to and truncate the quotient to derive a quantized coefficient of a quantized coefficient block that corresponds to the unquantized coefficient block;
receive, from a context-adaptive binary arithmetic coder (CABAC), an indication of a bitcost of a video bitstream resulting from compressing the video, the primary quantizer to alter the rounding in response to the indication;
derive, based on a context model of the CABAC, a first bitcost value of using the quantized coefficient in compressing the video, the context model retrieved from among multiple context models based on an indication provided to the CABAC of the context model as an initial context model;
derive, based on the context model of the CABAC, a second bitcost value of replacing the quantized coefficient with an alternate value derived by subtracting a value of one from an absolute value of the quantized coefficient in compressing the video;
derive a first bitcost value and a second bitcost value for a second frame of the video as estimated bitcost values using the context model of the CABAC without incurring a delay to receive a new context model of the multiple context models as a new initial context model and without the CABAC generating actual bitcost values for the second frame, the first bitcost value for the second frame derived using a quantized coefficient of a quantized coefficient block of the second frame, the second bitcost value to replace the quantized coefficient of the quantized coefficient block of the second frame with an alternate value derived from quantized coefficient of the quantized coefficient block of the second frame; and
store source data representing the video in a storage.

7. The device of claim 6, the memory storing instructions which when executed by the processor circuit cause the processor circuit to:
derive a first distortion value of using the quantized coefficient of the quantized coefficient block of the first frame in compressing the video based at least in part on the unquantized coefficient; and
derive a second distortion value of using the alternate value in compressing the video based at least in part on the unquantized coefficient.

8. The device of claim 7, the memory storing instructions which when executed by the processor circuit cause the processor circuit to:
derive a first rate-distortion (RD) cost from a sum of the first bitcost value of the first frame and the first distortion value; and
derive a second RD cost from a sum of the second bitcost value of the first frame and the second distortion value.

9. The device of claim 8, the memory storing instructions which when executed by the processor circuit cause the processor circuit to:
selectively replace the quantized coefficient of the quantized coefficient block of the first frame with the alternate value in compressing the video based on a comparison of at least a first overall cost of using a first combination of quantized coefficients of the quantized coefficient block of the first frame and alternate values associated with the quantized coefficient block of the first frame in compressing the video and a second combination of quantized coefficients of the quantized coefficient block of the first frame and alternate values associated with the quantized coefficient block of the first frame in compressing the video, the first combination comprising the quantized coefficient of the quantized coefficient block of the first frame, the second combination comprising the alternate value, the first overall cost comprising the first RD cost, and the second overall cost comprising the second RD cost.

10. The device of claim 6, comprising at least one of a display to visually present the video or an interface to transmit the video to a display device via a network following compression of the video.

11. A computer-implemented method for compressing motion video comprising:
deriving a first bitcost value of using a quantized coefficient of a quantized coefficient block of a first frame of a video in compressing the video, the first bitcost value based on a context model of a context-adaptive binary arithmetic coder (CABAC), the context model retrieved from among multiple context models based on an indication provided to the CABAC of the context model as an initial context model;
concurrent with the derivation of the first bitcost value, deriving a second bitcost value of replacing the quantized coefficient with an alternate value derived by subtracting a value of one from an absolute value of the quantized coefficient in compressing the video, the second bitcost value based on the context model;
selectively replacing the quantized coefficient with the alternate value in compressing the video based on a comparison of at least the first bitcost value and the second bitcost value; and
deriving, based on the context model, a first bitcost value and a second bitcost value for a second frame of the video as estimated bitcost values without incurring a delay to receive a new context model of the multiple context models as a new initial context model and without the CABAC generating actual bitcost values for the second frame, the first bitcost value for the second frame derived using a quantized coefficient of a quantized coefficient block of the second frame, the second bitcost value to replace the quantized coefficient of the quantized coefficient block of the second frame with an alternate value derived from quantized coefficient of the quantized coefficient block of the second frame.

12. The computer-implemented method of claim 11, the method comprising:
deriving a first distortion value of using the quantized coefficient of the quantized coefficient block of the first frame in compressing the video based at least in part on an unquantized coefficient of an unquantized coefficient block of the first frame, the unquantized coefficient block corresponding to the quantized coefficient block of the first frame and the quantized coefficient of the quantized coefficient block of the first frame derived from the unquantized coefficient through quantization of the unquantized coefficient block; and
deriving a second distortion value of using the alternate value in compressing the video based at least in part on the unquantized coefficient.

13. The computer-implemented method of claim 12, comprising:
deriving the first distortion value from a squared difference between the quantized coefficient of the quantized coefficient block of the first frame and the unquantized coefficient; and
deriving the second distortion value from a squared difference between the alternate value and the unquantized coefficient.

14. The computer-implemented method of claim 12, comprising:
deriving a first overall cost of using a first combination of quantized coefficients of the quantized coefficient block of the first frame and alternate values associated with the quantized coefficient block of the first frame in compressing the video from a sum of at least the first bitcost value of the first frame and the first distortion value, the first combination comprising the quantized coefficient of the quantized coefficient block of the first frame;
deriving a second overall cost of using a second combination of quantized coefficients of the quantized coefficient block of the first frame and alternate values associated with the quantized coefficient block of the first frame in compressing the video from a sum of at least the second bitcost value of the first frame and the second distortion value of the first frame, the second combination comprising the alternate value; and
selectively replacing the quantized coefficient of the quantized coefficient block of the first frame with the alternate value in compressing the video based on a comparison of the first overall cost and the second overall cost.

15. The computer-implemented method of claim 11, comprising deriving the first bitcost value and the second bitcost value of the first frame concurrently, and deriving the first bitcost value and the second bitcost value of the second frame concurrently.

16. The computer-implemented method of claim 11, comprising at least one of visually presenting the video on a display or transmitting the video to a display device via a network following compression of the video.

17. At least one non-transitory machine-readable storage medium comprising instructions that when executed by a computing device, cause the computing device to:
derive a first bitcost value of using a quantized coefficient of a quantized coefficient block of a first frame of a video in compressing the video, the first bitcost value based on a context model of a context-adaptive binary arithmetic coder (CABAC), the context model retrieved from among multiple context models based on an indication provided to the CABAC of the context model as an initial context model;
concurrent with the derivation of the first bitcost value, derive a second bitcost value of replacing the quantized coefficient with an alternate value derived by subtracting a value of one from an absolute value of the quantized coefficient in compressing the video, the second bitcost value based on the context model;
selectively replace the quantized coefficient with the alternate value in compressing the video based on a comparison of at least the first bitcost value and the second bitcost value; and
derive a first bitcost value and a second bitcost value for a second frame of the video as estimated bitcost values using the context model of the CABAC without incurring a delay to receive a new context model of the multiple context models as a new initial context model and without the CABAC generating actual bitcost values for the second frame, the first bitcost value for the second frame derived using a quantized coefficient of a quantized coefficient block of the second frame, the second bitcost value to replace the quantized coefficient of the quantized coefficient block of the second frame with an alternate value derived from quantized coefficient of the quantized coefficient block of the second frame.

18. The at least one non-transitory machine-readable storage medium of claim 17, the computing device caused to:
derive a first distortion value of using the quantized coefficient of the quantized coefficient block of the first frame in compressing the video based at least in part on an unquantized coefficient of an unquantized coefficient block of the first frame, the unquantized coefficient block corresponding to the quantized coefficient block of the first frame and the quantized coefficient derived from the unquantized coefficient through quantization of the unquantized coefficient block; and
derive a second distortion value of using the alternate value in compressing the video based at least in part on the unquantized coefficient.

19. The at least one non-transitory machine-readable storage medium of claim 18, the computing device caused to:
derive the first distortion value from a squared difference between the quantized coefficient of the quantized coefficient block of the first frame and the unquantized coefficient; and
derive the second distortion value from a squared difference between the alternate value and the unquantized coefficient.

20. The at least one non-transitory machine-readable storage medium of claim 18, the computing device caused to:
derive a first overall cost of using a first combination of quantized coefficients of the quantized coefficient block of the first frame and alternate values associated with the quantized coefficient block of the first frame in compressing the video from a sum of at least the first bitcost value of the first frame and the first distortion value, the first combination comprising the quantized coefficient;
derive a second overall cost of using a second combination of quantized coefficients of the quantized coefficient block of the first frame and alternate values associated with the quantized coefficient block of the first frame in compressing the video from a sum of at least the second bitcost value of the first frame and the second distortion value, the second combination comprising the alternate value; and
selectively replace the quantized coefficient of the quantized coefficient block of the first frame with the alternate value in compressing the video based on a comparison of the first overall cost and the second overall cost.

21. The at least one non-transitory machine-readable storage medium of claim 17, the computing device caused to derive the first bitcost value and the second bitcost value of the first frame concurrently, the computing device caused to derive the first bitcost value and the second bitcost value of the second frame concurrently.

22. The at least one non-transitory machine-readable storage medium of claim 17, the computing device caused to transmit the video to a display device following compression of the video.

* * * * *

UNITED STATES PATENT AND TRADEMARK OFFICE
CERTIFICATE OF CORRECTION

PATENT NO. : 10,313,681 B2
APPLICATION NO. : 14/133078
DATED : June 4, 2019
INVENTOR(S) : Heon-Mo Koo et al.

Page 1 of 1

It is certified that error appears in the above-identified patent and that said Letters Patent is hereby corrected as shown below:

In the Claims

Column 32, Lines 46-49, Claim 4:
"The device of claim 1, comprising at least one of a display to visually present the video or an interface to transmit the video to a display service via a network following compression of the video."
Should be:
"The device of claim 1, comprising at least one of a display to visually present the video or an interface to transmit the video to a display device via a network following compression of the video."

Signed and Sealed this
Twentieth Day of October, 2020

Andrei Iancu
*Director of the United States Patent and Trademark Office*